United States Patent
Irie et al.

(10) Patent No.: US 9,565,677 B2
(45) Date of Patent: Feb. 7, 2017

(54) WIRELESS COMMUNICATION DEVICE

(71) Applicant: Panasonic Intellectual Property Management Co., Ltd., Osaka (JP)

(72) Inventors: Masataka Irie, Kanagawa (JP); Wee Yao Huang Gaius, Singapore (SG); Michael Sim Hong Cheng, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 28 days.

(21) Appl. No.: 14/427,955

(22) PCT Filed: Jun. 6, 2014

(86) PCT No.: PCT/JP2014/003032
§ 371 (c)(1),
(2) Date: Mar. 12, 2015

(87) PCT Pub. No.: WO2014/199610
PCT Pub. Date: Dec. 18, 2014

(65) Prior Publication Data
US 2015/0223222 A1    Aug. 6, 2015

(30) Foreign Application Priority Data

Jun. 14, 2013 (JP) .................................. 2013-126060

(51) Int. Cl.
*H04W 4/00* (2009.01)
*H04W 72/04* (2009.01)
(Continued)

(52) U.S. Cl.
CPC .......... *H04W 72/046* (2013.01); *H04B 7/086* (2013.01); *H04L 1/08* (2013.01); *H04W 72/0446* (2013.01)

(58) Field of Classification Search
None
See application file for complete search history.

(56) References Cited

U.S. PATENT DOCUMENTS

2008/0130534 A1* 6/2008 Tomioka ............... H04L 1/0009
370/310
2008/0218413 A1    9/2008 Li et al.
(Continued)

FOREIGN PATENT DOCUMENTS

| JP | 2003-244041 A | 8/2003 |
| JP | 2010-263297 | 11/2010 |
| WO | 2010/023890 | 3/2010 |

OTHER PUBLICATIONS

International Search Report of PCT application No. PCT/JP2014/003032 dated Aug. 19, 2014.

*Primary Examiner* — Phirin Sam
(74) *Attorney, Agent, or Firm* — Seed IP Law Group LLP

(57) ABSTRACT

There is provided a wireless communication device that includes: a receiving unit that receives a first transmission frame via a receiving antenna, the first transmission frame being a MAC frame transmitted from a communication partner; a response-frame generating unit that generates a first response frame indicating reception of the first transmission frame, based on the first transmission frame received via the receiving antenna; a transmitting unit that transmits the generated first response frame via a transmitting antenna; a determining unit that determines whether or not the same first transmission frame is retransmitted from the communication partner; and an antenna control unit that changes a beam pattern of the transmitting antenna, when the same first transmission frame is retransmitted from the communication partner.

14 Claims, 19 Drawing Sheets

(51) Int. Cl.
 *H04B 7/08* (2006.01)
 *H04L 1/08* (2006.01)

(56) References Cited

U.S. PATENT DOCUMENTS

| | | | |
|---|---|---|---|
| 2010/0177682 A1 | 7/2010 | Cheng et al. | |
| 2010/0309854 A1* | 12/2010 | Wu | H04B 7/0413 370/329 |
| 2011/0176420 A1 | 7/2011 | Shiotsuki et al. | |
| 2012/0020420 A1* | 1/2012 | Sakoda | H01Q 3/26 375/259 |
| 2012/0140658 A1* | 6/2012 | Kanzaki | H04B 7/0426 370/252 |
| 2013/0045690 A1* | 2/2013 | Seol | H04B 7/0417 455/63.4 |
| 2013/0208681 A1* | 8/2013 | Gore | H04B 1/7143 370/329 |
| 2014/0055302 A1* | 2/2014 | Jia | H01Q 3/34 342/372 |

* cited by examiner

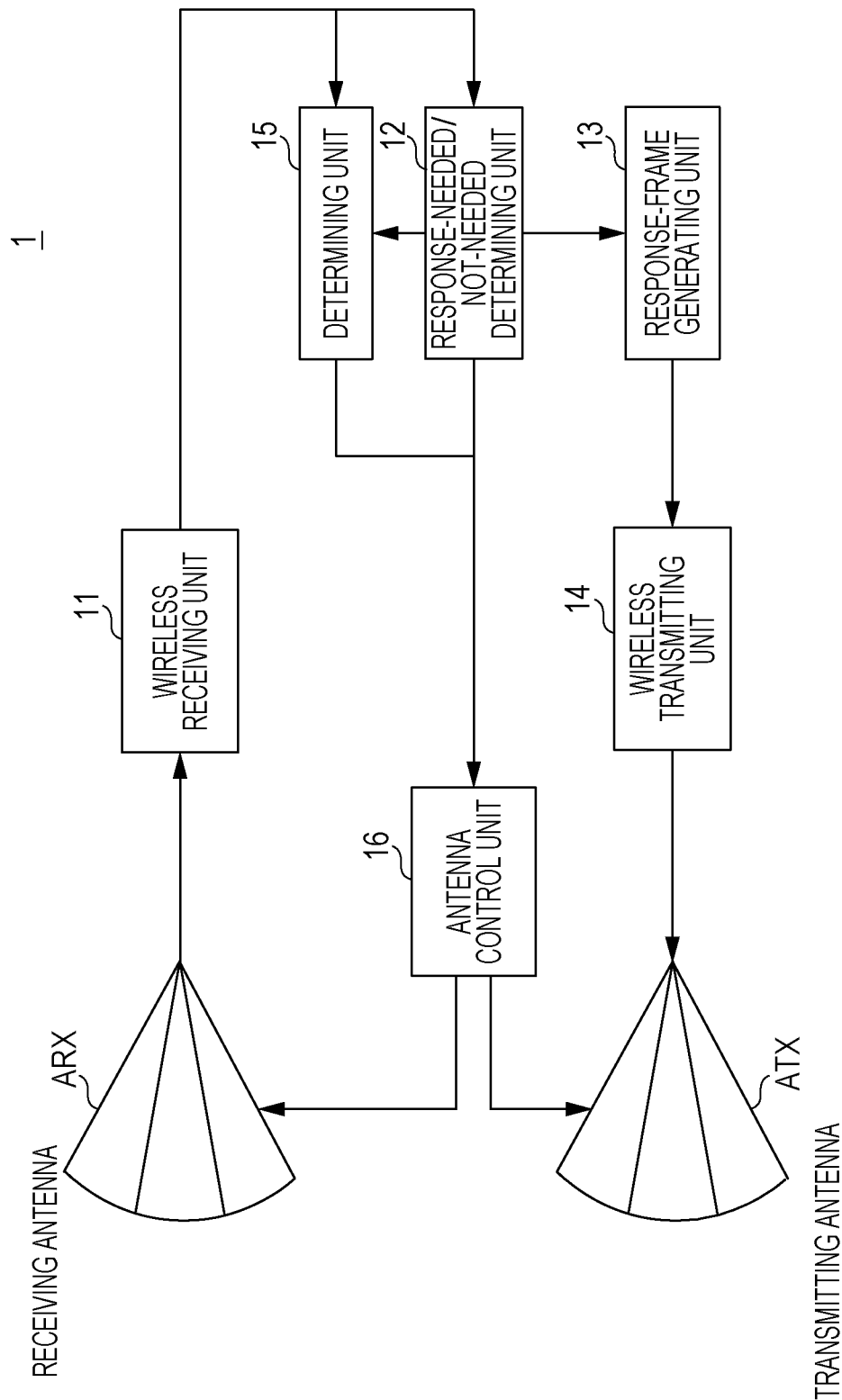

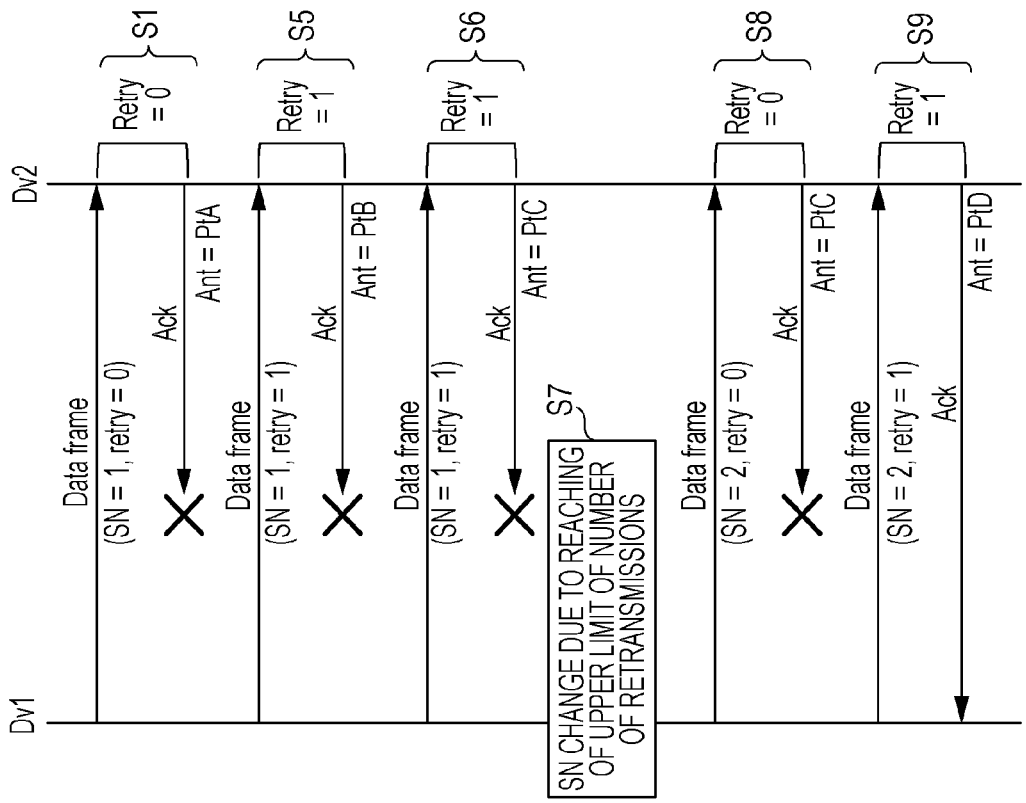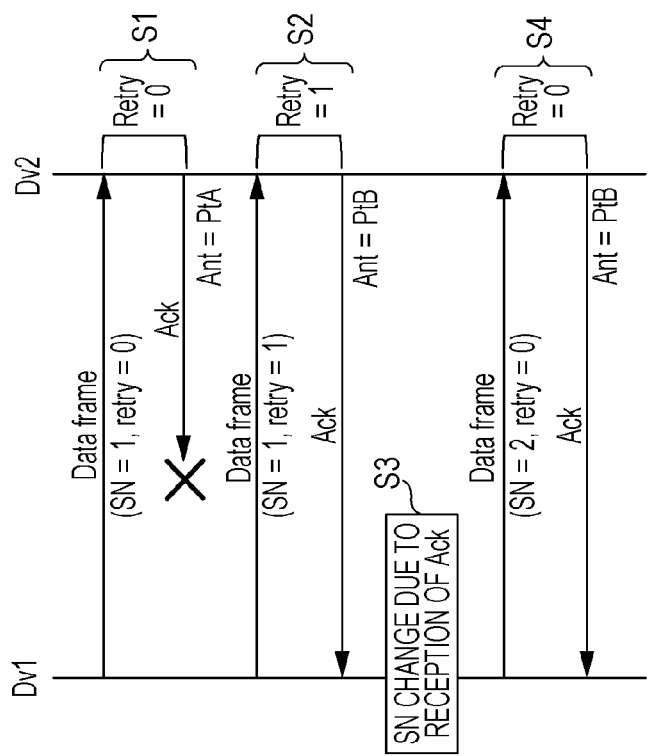

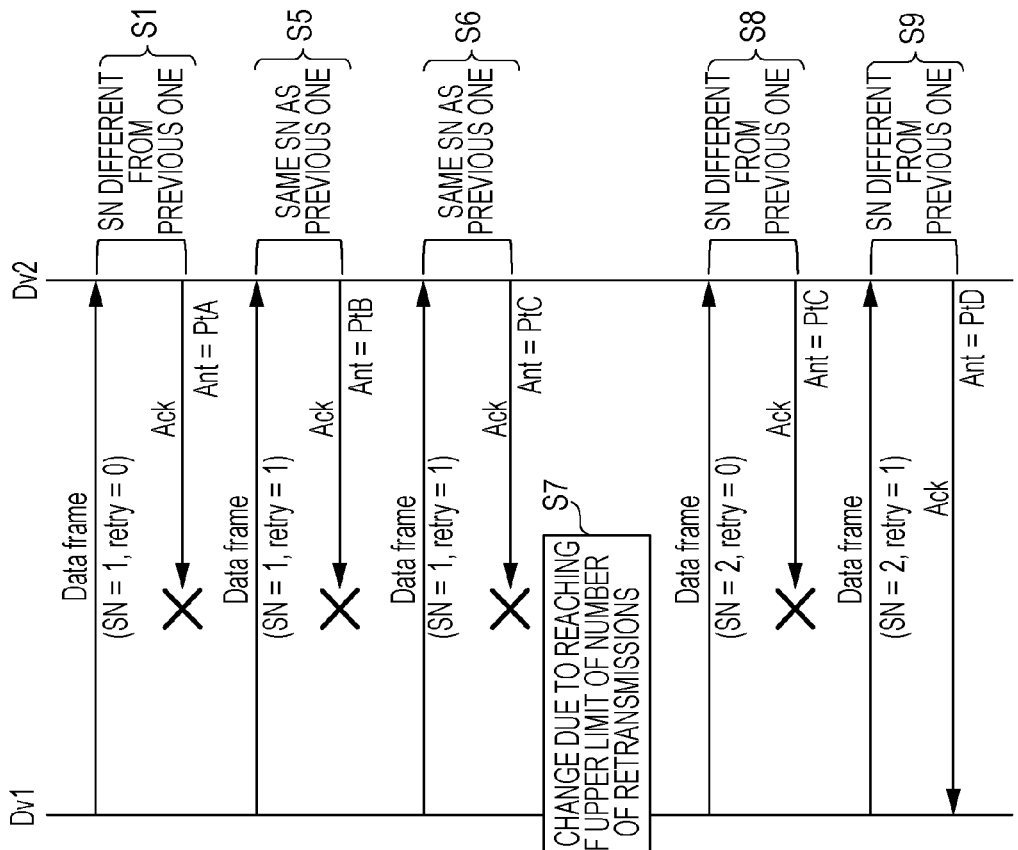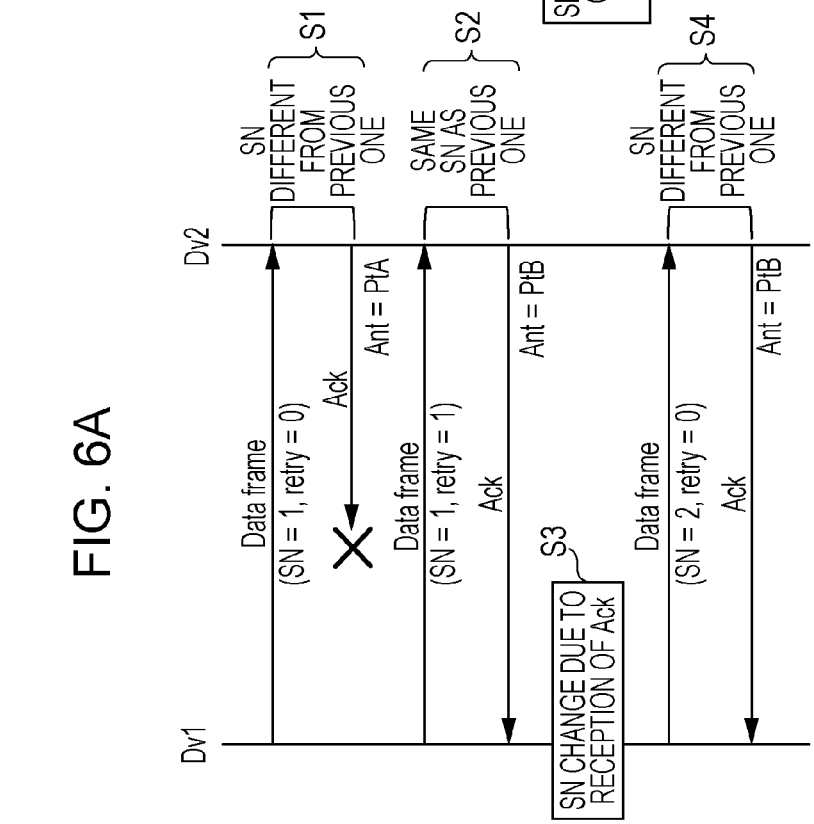

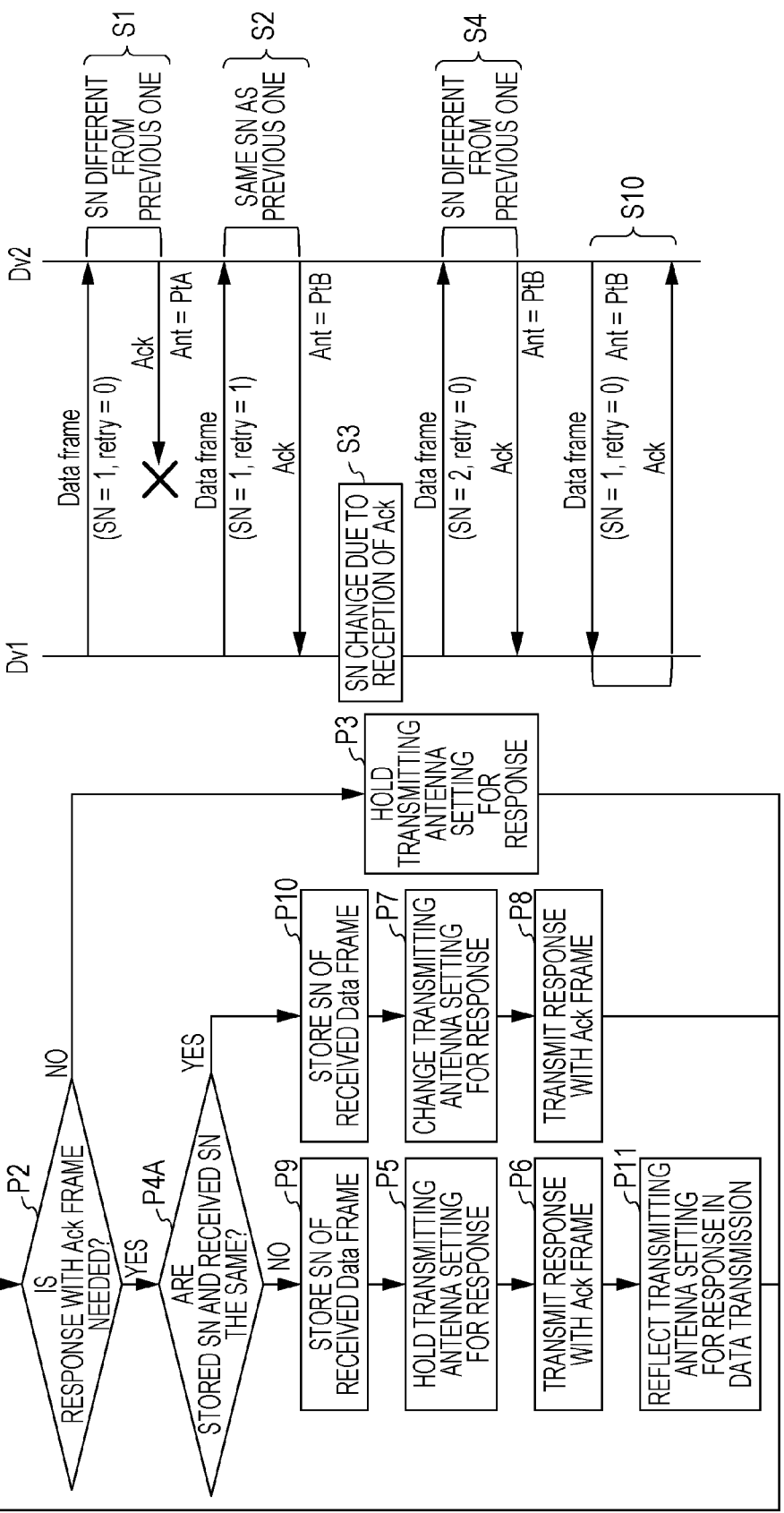

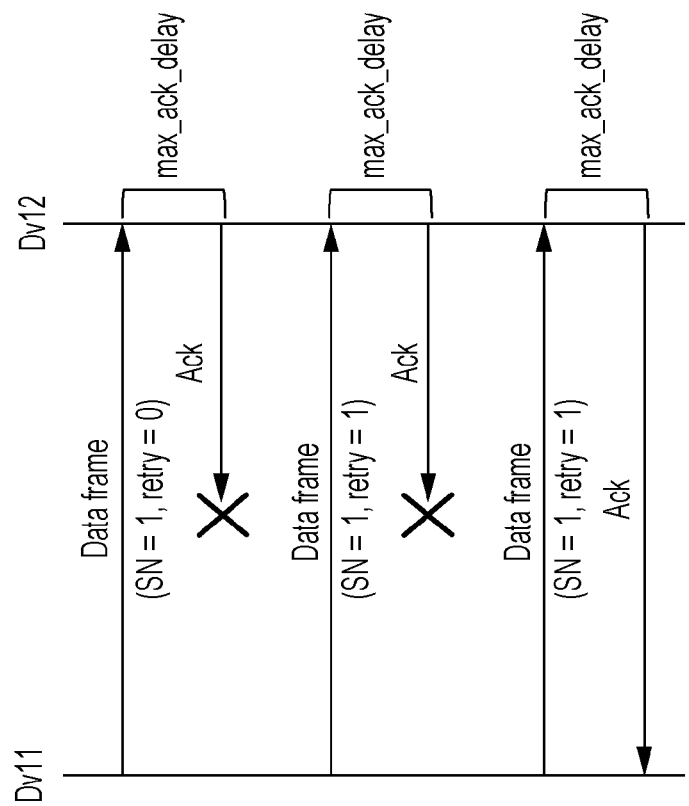
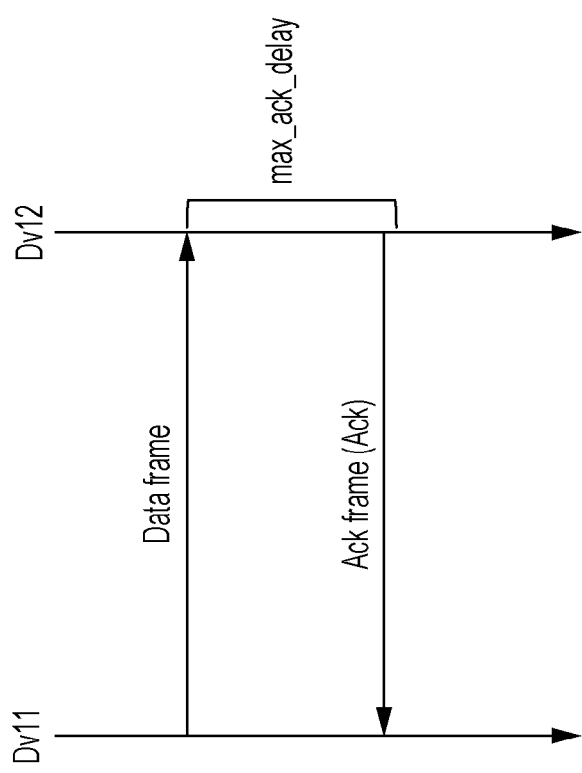

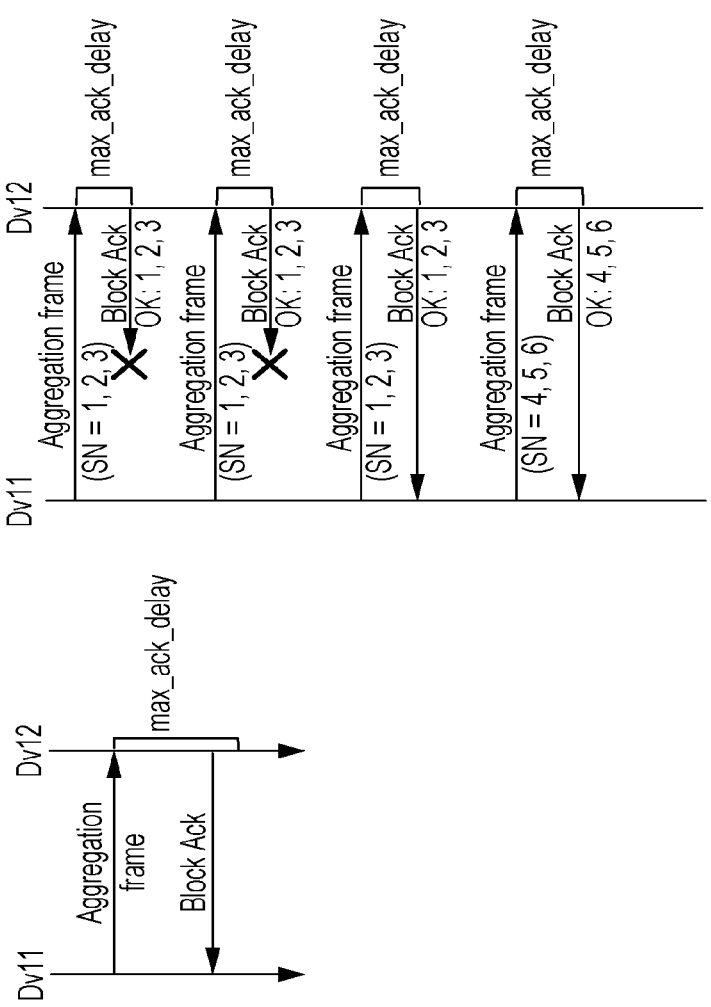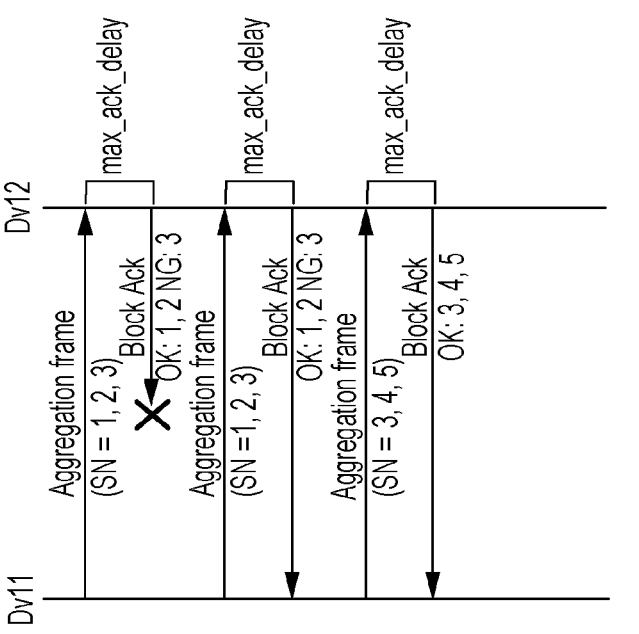
FIG. 17A
FIG. 17B
FIG. 17C

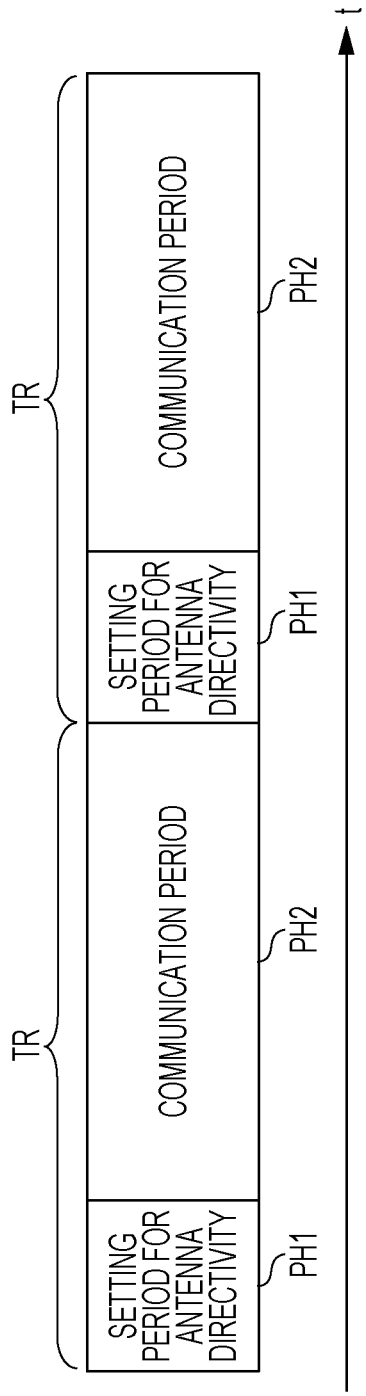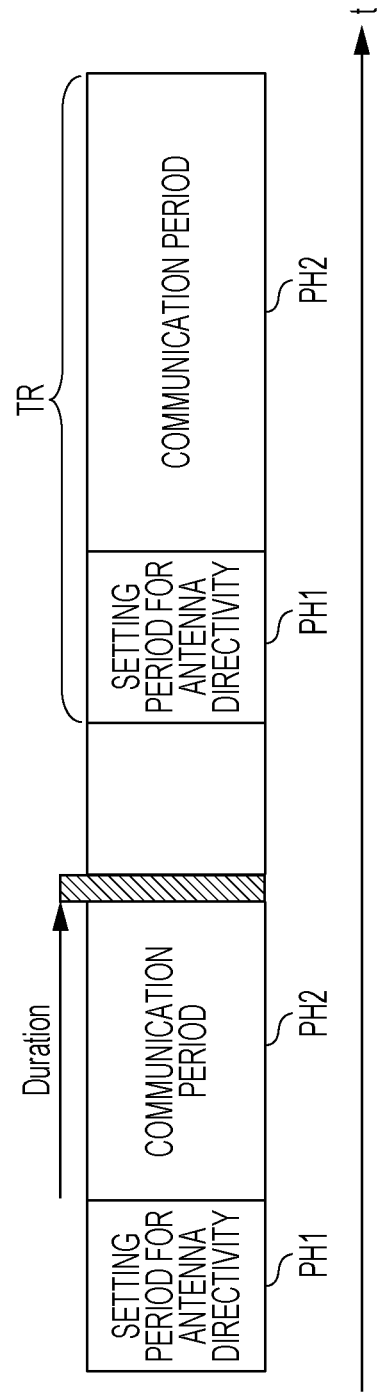

WIRELESS COMMUNICATION DEVICE

CROSS-REFERENCE TO RELATED APPLICATIONS

The present application is a U.S. national stage application of PCT International Application No. PCT/JP2014/003032 filed on Jun. 6, 2014, and claims the benefit of foreign priority to Japanese patent application 2013-126060 filed on Jun. 14, 2013, the contents all of which are incorporated by reference.

TECHNICAL FIELD

The present disclosure relates to a wireless communication device that switches a beam pattern of an antenna in wireless communication.

BACKGROUND ART

Wireless LANs (Local Area Networks) defined in, for example, the IEEE (The Institute of Electrical and Electronics Engineers, Inc.) 802.11 (for example, IEEE802.11a or IEEE802.11b) communication standard have been known for wireless communication for realizing high-speed data transmission.

Nowadays, with the increasing functionality of digital equipment, digital equipment including wireless communication devices that can use wireless LANs has been in widespread use. Digital equipment can transmit a large amount of data (for example, HD (High-Definition) video data) to other digital equipment, for example, by causing wireless communication devices to directly communicate with each other without the involvement of an access point.

As a communication method for causing wireless communication devices to directly communicate with each other, for example, wireless communication using 60 [GHz] millimeter waves has attracted attention. Millimeter wave communication uses a broader band than conventional wireless LAN communication and thus enables high-speed wireless communications, for example, at 1 [Gbps] or higher, when a range where millimeter wave communication is allowed is effectively utilized. However, radio waves in the 60 [GHz] millimeter wave band have short wavelengths and have a strong characteristic of traveling straight, and are thus susceptible to changes in a radio-wave propagation environment (in the communication environment).

For example, when a human crosses or an obstruction exists between a wireless communication device that transmits data and a wireless communication device that receives the data or when the hand of a human who holds either of the wireless communication devices moves or rotates, the communication environment changes, and the quality of communication deteriorates. Hereinafter, a wireless communication device that transmits data is referred to as a "data-transmitting wireless communication device", and a wireless communication device that receives data is referred to as a "data-receiving wireless communication device". Also, the data-transmitting wireless communication device has a configuration including a wireless transmitting unit and a wireless receiving unit, and the data-receiving wireless communication device has a configuration including a wireless transmitting unit and a wireless receiving unit.

Accordingly, in millimeter wave communication, beamforming is used to set, for example, a beam pattern that suits one of the directivities of a transmitting antenna and a receiving antenna or a beam pattern that suits both of the directivities of the transmitting antenna and the receiving antenna. The beam pattern of each antenna is set for a single communication partner or is set so that it is appropriate for a plurality of communication partners, although this is not optimum.

In wireless communication devices that use the millimeter wave band to perform wireless communication, the transmitting antenna and the receiving antenna may be used separately, taking the amount of signal attenuation into account, and different beam patterns may be set for the transmitting antenna and the receiving antenna. For example, the receiving antenna is set to be omnidirectional, and a beam pattern having a main beam formed in a particular direction is set for the transmitting antenna.

Also, communication protocols in millimeter wave communication involve a process (a procedure) for determining the beam pattern of the transmitting antenna or the receiving antenna. For example, Patent Literature 1 is known as prior art for determining the beam pattern of an antenna in millimeter wave communication.

In Patent Literature 1, each time a data-transmitting wireless communication device transmits a transmission frame, it starts a timer and counts the number of transmissions (the number of retransmissions) of a transmission frame (a data frame). When the data-transmitting wireless communication device retransmits a data frame because a response with an Ack frame is not returned from a data-receiving wireless communication device, the data-transmitting wireless communication device changes the beam pattern of the transmitting antenna to another beam pattern, when the count value of the timer or the number of retransmissions of the transmission frame reaches a certain value.

CITATION LIST

Patent Literature

PTL 1: U.S. Pat. No. 7,652,624

SUMMARY OF INVENTION

Technical Problem

The present inventor has studied a wireless communication device that switches the beam pattern of an antenna in wireless communication. However, Patent Literature 1 noted above has a problem in that there are cases in which the beam pattern of a transmitting antenna is changed even when the change is not necessary, in a data-transmitting wireless communication device, although a transmission frame is received by a data-receiving wireless communication device because the data-transmitting wireless communication device changes the beam pattern of the transmitting antenna a under certain condition.

In order to overcome the above-described problem, the present disclosure provides a wireless communication device that avoids an unnecessary change of the beam pattern of an antenna and that suppresses deterioration of the quality of communication.

Solution to Problem

The present disclosure provides a wireless communication device that includes: a receiving unit that receives a first transmission frame via a receiving antenna, the first transmission frame being a MAC frame transmitted from a communication partner; a response-frame generating unit that generates a first response frame indicating reception of the first transmission frame, based on the first transmission frame received via the receiving antenna; a transmitting unit that transmits the generated first response frame via a transmitting antenna; a determining unit that determines whether or not the same first transmission frame is retransmitted from the communication partner; and an antenna control unit that changes a beam pattern of the transmitting antenna, when the same first transmission frame is retransmitted from the communication partner.

Advantageous Effects of Invention

According to the present disclosure, it is possible to avoid an unnecessary change of the beam pattern of an antenna and it is possible to suppress deterioration of the quality of communication.

FIG. 2 is a block diagram showing one example of an internal basic configuration of a wireless communication device in each embodiment;

FIG. 5A is a sequence diagram showing one example of signaling in which a sequence number SN is changed upon reception of an Ack frame, the signaling being performed by the data-transmitting wireless communication device and the data-receiving wireless communication device in the first embodiment;

FIG. 5B is a sequence diagram showing one example of signaling in which a sequence number SN is changed upon reaching of an upper limit of the number of retransmissions, the signaling being performed by the data-transmitting wireless communication device and the data-receiving wireless communication device in the first embodiment;

FIG. 6A is a sequence diagram showing another example of signaling in which a sequence number SN is changed upon reception of an Ack frame, the signaling being performed by the data-transmitting wireless communication device and the data-receiving wireless communication device in the first embodiment;

FIG. 6B is a sequence diagram showing another example of signaling in which a sequence number SN is changed upon reaching of the upper limit of the number of retransmissions, the signaling being performed by the data-transmitting wireless communication device and the data-receiving wireless communication device in the first embodiment;

FIG. 8A is a flowchart illustrating one example of an operation procedure for the data-receiving wireless communication device in the first embodiment to transmit a data frame by using the beam pattern of the transmitting antenna for transmitting an Ack frame;

FIG. 8B is a sequence diagram showing one example of signaling for the data-receiving wireless communication device shown in FIG. 8A to transmit a data frame by using the beam pattern of the transmitting antenna for transmitting an Ack frame;

FIG. 15A is a sequence diagram showing the concept of signaling of a single data frame between a conventional data-transmitting wireless communication device and a data-receiving wireless communication device;

FIG. 15B is a sequence diagram showing one example of signaling of a single data frame between a conventional data-transmitting wireless communication device and a data-receiving wireless communication device;

FIG. 17A is a sequence diagram showing the concept of signaling of a transmission aggregation frame between the conventional data-transmitting wireless communication device and the data-receiving wireless communication device;

FIG. 17B is a sequence diagram showing one example of signaling of a transmission aggregation frame between the conventional data-transmitting wireless communication device and the data-receiving wireless communication device;

FIG. 17C is a sequence diagram showing another example of signaling of a transmission aggregation frame between the conventional data-transmitting wireless communication device and the data-receiving wireless communication device;

FIG. 18A is an explanatory diagram of a transmission cycle including a setting period for setting the beam pattern of an antenna and a communication period in a conventional millimeter wave communication;

FIG. 18B is an explanatory diagram of a timing at which deterioration of a communication environment occurs in the transmission period including the setting period for setting the beam pattern of the antenna and the communication period in the conventional millimeter wave communication;

DESCRIPTION OF EMBODIMENTS

Figure 1B:
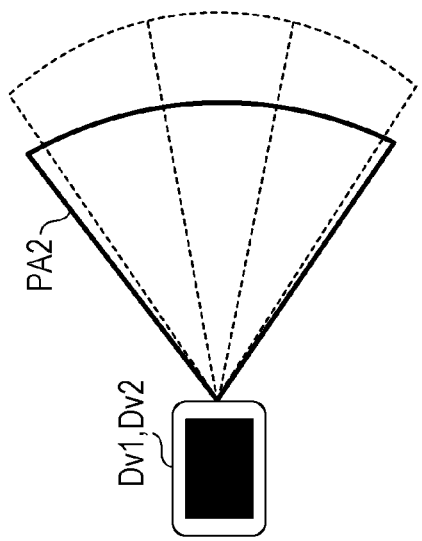
FIG. 1B is a diagram showing a quasi-omnidirectional beam pattern.

Background from which Content of Each Embodiment is Derived

First, before embodiments of a wireless communication device according to the present disclosure are described, Patent Literature 1 noted above and problems with Patent Literature 1 will be described as the background from which content of each embodiment is derived. A data-transmitting wireless communication device has a configuration including a wireless transmitting unit and a wireless receiving unit, and a data-receiving wireless communication device has a configuration including a wireless transmitting unit and a wireless receiving unit. Also, a description will be given assuming a case in which the data-transmitting wireless communication device and the data-receiving wireless communication device have a similar configuration and perform, for example, direct communication.

Communication protocols (for example, IEEE802.11ad) using millimeter wave communication involve a process (a procedure) for determining a beam pattern of a transmitting antenna or a receiving antenna (see FIG. 18A). FIG. 18A is an explanatory diagram of transmission cycles TR each including a setting period PH1 for setting the beam pattern of an antenna and a communication period PH2 in conventional millimeter wave communication. FIG. 18B is an explanatory diagram of a timing at which deterioration of a communication environment occurs in the transmission cycle TR including the setting period PH1 for setting the beam pattern of the antenna and the communication period PH2 in the conventional millimeter wave communication.

Each transmission cycle TR shown in FIG. 18A includes the setting period PH1 (Antenna Training Phase) for setting the beam pattern of the antenna in the millimeter wave communication and the actual-communication (data transaction) period PH2 (Communication Phase). The time spans of the transmission cycles TR may be the same or may be different from those of other transmission cycles TR.

In the setting period PH1, the data-transmitting wireless communication device sets a plurality of antenna beam patterns having different directivities and transmits a frame for directivity verification to the data-receiving wireless communication device, which is a communication partner, the frame including information regarding the antenna beam pattern. After receiving the frame for directivity verification, the data-receiving wireless communication device returns, to the data-transmitting wireless communication device, a response frame including information regarding which antenna beam pattern is appropriate and regarding an antenna to be used in the communication period PH2.

On the basis of the response frame returned from the data-receiving wireless communication device, the data-transmitting wireless communication device sets a transmitting-antenna beam pattern for a communication with the data-receiving wireless communication device. As a result, the transmitting-antenna beam pattern for the communication partner of the data-transmitting wireless communication device is set in the setting period PH1.

However, in the transmission cycle TR shown in FIG. 18A, the communication period PH2 becomes short in accordance with the length of the setting period PH1, compared with a transmission cycle in which the setting period PH1 is not set. Since the time span of the transmission cycle TR does not change, the communication period PH2 is reduced, and the available channel access time in the communication period PH2 is reduced, as the setting period PH1 increases.

Also, there is a problem in that, when a time (Duration) passes from start of the communication period PH2 after the setting period PH1, and a change occurs in the communication environment (see FIG. 18B), the beam pattern of the transmitting antenna for the communication partner of the data-transmitting wireless communication device needs to be set again in the remaining communication period PH2, as in the setting period PH1, because of the characteristics of millimeter waves.

In Patent Literature 1, to address the above-described problem, the data-transmitting wireless communication device reduces the number of settings of the beam pattern of the transmitting antenna and selects an appropriate antenna beam pattern during communication.

However, in Patent Literature 1, as to the cause for why the data-transmitting wireless communication device retransmits a data frame when an Ack frame has not arrived at the data-transmitting wireless communication device, there are the following two possible causes. A first cause is a case in which, since a data frame has not arrived at the data-receiving wireless communication device, the data-receiving wireless communication device has not returned an Ack frame. A second cause is a case in which, although a data frame has arrived at the data-receiving wireless communication device, an Ack frame returned from the data-receiving wireless communication device has not arrived at the data-transmitting wireless communication device.

Accordingly, in Patent Literature 1, when the cause for why the data-transmitting wireless communication device retransmits a data frame is the above-described second cause, even if the beam pattern of the transmitting antenna of the data-transmitting wireless communication device is appropriate, the data-transmitting wireless communication device changes the beam pattern of the transmitting antenna to another beam pattern to retransmit the data frame. Thus, since the data-transmitting wireless communication device performs an unnecessary change of the beam pattern of the transmitting antenna, there is a problem in that the quality of communication between the data-transmitting wireless communication device and the data-receiving wireless communication device, which is a communication partner, deteriorates.

Accordingly, in each embodiment below, a description will be given of an example of a wireless communication device that avoids an unnecessary change of the beam pattern of an antenna and that suppresses deterioration of the quality of communication.

Next, before each embodiment of a wireless communication device according to the present disclosure is described, technical knowledge that serves as a premise of the content of each embodiment will be described with reference to FIG. 14 to FIG. 17. In the description in FIG. 14 to FIG. 17, for ease of description, a case in which two wireless communication devices perform direct communication is assumed: a wireless communication device at a transmitting end is simply referred to as a "data-transmitting wireless communication device", and a wireless communication device at a receiving end is simply referred to as a "data-receiving wireless communication device" (for example, see FIG. 15A or FIG. 17A).

Figure 14A:
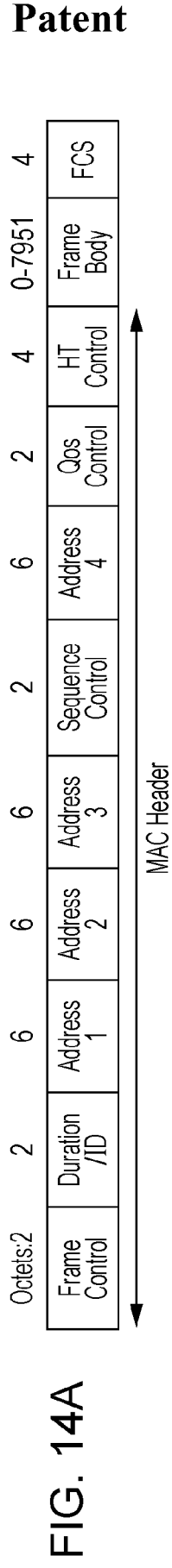
FIG. 14A is a diagram showing one example of the format of a conventional MAC frame.
Figure 14B:
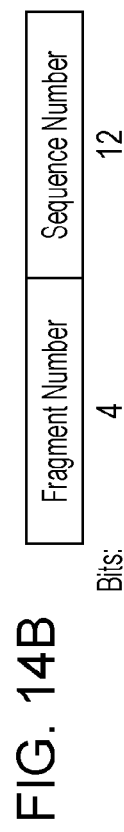
FIG. 14B is a diagram showing one example of the format of a conventional sequence control field.
Figure 14C:
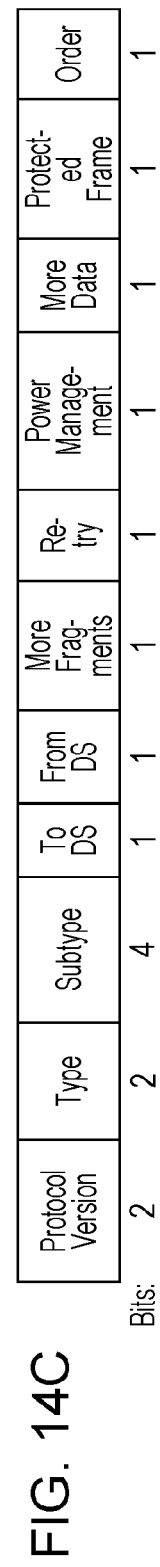
FIG. 14C is a diagram showing one example of the format of a conventional frame control field.
Figure 14D:
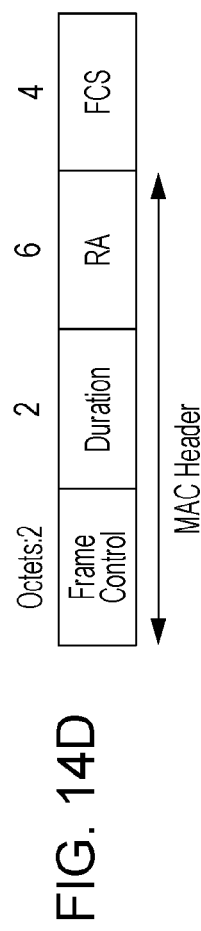
FIG. 14D is a diagram showing one example of the format of a conventional Ack frame.

FIG. 14A is a diagram showing one example of the format of a conventional MAC frame. FIG. 14B is a diagram showing one example of the format of a conventional sequence control field. FIG. 14C is a diagram showing one example of the format of a conventional frame control field. FIG. 14D is a diagram showing one example of the format of a conventional Ack frame. A wireless communication device in a first embodiment below transmits/receives a MAC frame (for example, a Data frame) having, for example, the format shown in FIG. 14A.

The MAC frame shown in FIG. 14A includes fields for Frame Control, Duration/ID, Address 1, Address 2, Address 3, Sequence Control, Address 4, Qos (Quality of Service) control, HT (High Throughput) control, Frame Body, and FCS (Frame Check Sequence). In the MAC frame, the fields other than for the frame body and the FCS constitute a MAC Header.

The sequence control field shown in FIG. 14B includes fields for Fragment Number and Sequence Number. The sequence number indicates an identification number or a transmission order of the MAC frame shown in FIG. 14A. For example, when the sequence number field is 12 bits, the sequence number is an integer value of one of 0 to 4095.

The frame control field shown in FIG. 14C includes fields for Protocol Version, Type, Subtype, To DS (Distribution Service), From DS, More Fragments, Retry, Power Management, More Data, Protected Frame, and Order. A retry bit indicating whether or not the MAC frame shown in FIG. 14A is retransmitted is stored in the retry field. For example, when the retry bit is 1, this indicates that the MAC frame is a retransmitted MAC frame, and when the retry bit is 0, this indicates that the MAC frame is a newly transmitted MAC frame.

The Ack frame shown in FIG. 14D includes fields for Frame Control, Duration, RA (Receiver Address, receiving-station address), and FCS. In the Ack frame, the fields other than for the FCS constitute a MAC Header.

Wireless communication standards (for example, IEEE802.11) that realize high-speed data transmission define a communication protocol for CSMA/CA (Carrier Sense Multiple Access with Collision Avoidance) or for time division multiplexing communication (SPCA: Service Period Channel Access) using centralized control involving wireless band assignment at a wireless base station.

For example, in CSMA/CA, a data-transmitting wireless communication device Dv11 performs carrier sense before transmitting a data frame and starts transmission of the data frame when no carrier is detected in a predetermined specified time. The data-transmitting wireless communication device Dv11 and a data-receiving wireless communication device Dv12 perform a series of data frame transmission and Ack frame response transmission sequences over a certain period called a TXOP (Transmission Opportunity) initiated, for example, by transmission of a data frame (see FIG. 15A).

In CSMA/CA, after determining, through the carrier sense, that transmission to the data-receiving wireless communication device Dv2 is to be performed, the data-transmitting wireless communication device Dv1 uses, for example, the transmitting-antenna beam pattern set and held in the setting period PH1 shown in FIG. 18A to transmit a data frame to the data-receiving wireless communication device Dv2.

However, it is difficult for the data-receiving wireless communication device Dv2 to know, in advance, the time at which the data-transmitting wireless communication device Dv1 transmits a data frame. Also, since there is also the possibility that a data frame is transmitted from other data-transmitting wireless communication devices to the data-receiving wireless communication device Dv2 at a point in time, the data-receiving wireless communication device Dv2 sets the receiving-antenna beam pattern to a large range so as to be able to receive data frames transmitted from the data-transmitting wireless communication device Dv1 and the other data-transmitting wireless communication device (see FIG. 1A or FIG. 1B).

FIG. 15A is a sequence diagram showing the concept of signaling of a single data frame between a conventional data-transmitting wireless communication device Dv11 and a conventional data-receiving wireless communication device Dv12. When the data-receiving wireless communication device Dv12 properly receives a data frame transmitted by the data-transmitting wireless communication device Dv11, it makes a response with an Ack frame serving as a response frame to the data-transmitting wireless communication device Dv11 within a predetermined period called a max ack delay.

Upon receiving the Ack frame, the data-transmitting wireless communication device Dv11 determines that the data frame transmitted by the data-transmitting wireless communication device Dv11 was properly received by the data-receiving wireless communication device Dv12, and when the data-transmitting wireless communication device Dv11 does not receive the Ack frame, it determines that the data frame transmitted by the data-transmitting wireless communication device Dv11 was not properly received by the data-receiving wireless communication device Dv12.

When the data-transmitting wireless communication device Dv11 receives the Ack frame, it determines that a next data frame is to be transmitted, increments the sequence number (SN) assigned to each data frame by 1, and generates a data frame in which the retry bit is set to 0. The sequence number is managed in association with an address of the data-transmitting wireless communication device Dv11 and an address and a TID (Traffic Identifier) of the data-receiving wireless communication device Dv12.

On the other hand, when the data-transmitting wireless communication device Dv11 does not receive an Ack frame, it retransmits the same data frame. However, the sequence number of the data frame to be retransmitted is not changed, and the retry bit is set to 1 (see FIG. 15B).

FIG. 15B is a sequence diagram showing one example of signaling of a single data frame between the conventional data-transmitting wireless communication device Dv11 and the data-receiving wireless communication device Dv12. When the data-transmitting wireless communication device Dv11 does not properly receive an Ack frame corresponding to a transmitted data frame, for example, it retransmits the data frame in which, for example, the sequence number is held at 1 and the retry bit is set to 1 to the data-receiving wireless communication device Dv12.

When the data-transmitting wireless communication device Dv11 does not properly receive an Ack frame again after transmitting the data frame in which the sequence number is held at 1 and the retry bit is set to 1 to the data-receiving wireless communication device Dv12, the data-transmitting wireless communication device Dv11 retransmits the data frame. Also, the data-transmitting wireless communication device Dv11 counts the number of retransmissions and does not perform retransmissions that exceed a predetermined upper limit number of times. Also, when the data-transmitting wireless communication device Dv11 determines that the transmission of a data frame to be retransmitted succeeds, it resets the counter for the number of retransmissions.

Figure 16A:
FIG. 16A is a diagram showing one example of the format of a conventional A-MPDU frame.
Figure 16B:
FIG. 16B is a diagram showing one example of the format of a conventional A-MPDU sub frame.
Figure 16C:
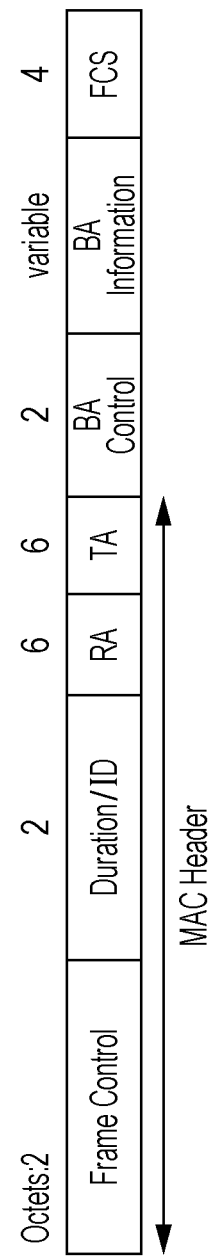
FIG. 16C is a diagram showing one example of the format of a conventional block Ack frame.

FIG. 16A is a diagram showing one example of the format of a conventional A-MPDU frame. FIG. 16B is a diagram showing one example of the format of a conventional A-MPDU subframe. FIG. 16C is a diagram showing one example of the format of a conventional block Ack frame. A wireless communication device in a second embodiment below transmits/receives, for example, an Aggregation frame (A-MPDU: Aggregate Medium Access Control Protocol Data Unit) having the format shown in FIG. 16A.

The aggregation frame shown in FIG. 16A includes fields for a plurality of A-MPDU sub frames. The A-MPDU subframe shown in FIG. 16B includes fields for an MPDU delimiter serving as segmentation information of the A-MPDU subframe, an MPDU that is similar to the MAC frame shown in FIG. 14A, and Padding for alignment.

The block Ack frame shown in FIG. 16C includes fields for Frame Control, Duration/ID, RA (Receiver Address) representing a reception-destination address of the block Ack frame, TA (Transmission Address) representing a transmission-source address of the block Ack frame, BA control (Block Ack Control), BA information (Block Ack Information), and FCS. In the block Ack frame, fields other than for the BA control, the BA information, and the FCS constitute a MAC Header.

With the aim of improving the transmission efficiency, a system is also known in which MAC frames having a plurality of sequence numbers are transmitted/received at the same time through transmission of the aggregation frame (A-MPDU) shown in FIG. 16A and a response using a block Ack frame indicating the reception of the aggregation frame. By returning the block Ack frame, the data-receiving wireless communication device Dv12 can make responses at the same time about properly receiving (Ack) or not properly receiving (Nack (No Acknowledge)) with respect to a plurality of data frames (MPDU) coupled as an aggregation frame (see FIG. 17A).

FIG. 17A is a sequence diagram showing the concept of signaling of a transmission aggregation frame between the conventional data-transmitting wireless communication device and the data-receiving wireless communication device. When the data-receiving wireless communication device Dv12 receives the data frame(s) (MPDU) having some or all of the sequence numbers in the aggregation frame transmitted by the data-transmitting wireless communication device Dv11, the data-receiving wireless communication device Dv12 makes a response with a block Ack frame serving as a response frame to the data-transmitting wireless communication device Dv11 within a predetermined period called a max ack delay.

Upon receiving the block Ack frame, the data-transmitting wireless communication device Dv11 determines that the data frame(s) (MPDU) having some or all of the sequence numbers in the aggregation frame transmitted by the data-transmitting wireless communication device Dv11 was received by the data-receiving wireless communication device Dv12, and when the data-transmitting wireless communication device Dv11 does not receive the block Ack frame, it determines that the aggregation frame transmitted by the data-transmitting wireless communication device Dv11 was not properly received by the data-receiving wireless communication device Dv12.

When the data-transmitting wireless communication device Dv11 successfully receives the block Ack frame, it analyzes the contents of the block Ack frame and determines the sequence number of each data frame (MPDU) that was properly received and the sequence number of each data frame (MPDU) that was not properly received. In accordance with a result of the determination, the data-transmitting wireless communication device Dv11 generates an aggregation frame including the sequence number of each data frame (MPDU) that was not properly received and the sequence number of each data frame (MPDU) that is to be newly transmitted (see FIG. 17C).

On the other hand, when the data-transmitting wireless communication device Dv11 does not receive the block Ack frame, it retransmits the same aggregation frame (FIG. 17B).

FIG. 17B is a sequence diagram showing one example of signaling of a transmission aggregation frame between the conventional data-transmitting wireless communication device and the data-receiving wireless communication device. FIG. 17C is a sequence diagram showing another example of signaling of a transmission aggregation frame between the conventional data-transmitting wireless communication device and the data-receiving wireless communication device.

Next, each embodiment of a wireless communication device according to the present disclosure will be described with reference to the drawings. The wireless communication device in each embodiment wirelessly communicates with a wireless communication device, which is a communication partner, for example, by using a millimeter wave (for example, 60 [GHz]) defined by the IEEE802.11ad communication standard. Also, in each embodiment below, a description will be given assuming a case in which a wireless communication device that transmits data (hereinafter simply referred to as a "data-transmitting wireless communication device") in each embodiment and a wireless communication device that receives data (hereinafter simply referred to as a "data-receiving wireless communication device") in each embodiment have a similar configuration and perform, for example, direct communication. Also, the data-transmitting wireless communication device has a configuration including a wireless transmitting unit and a wireless receiving unit, and the data-receiving wireless communication device has a configuration including a wireless transmitting unit and a wireless receiving unit.

(Beam Pattern of Antenna)

First, formation of the beam pattern of a transmitting antenna or a receiving antenna of the wireless communication device in each embodiment will be described with reference to FIG. 1A to FIG. 1D.

Figure 1D:
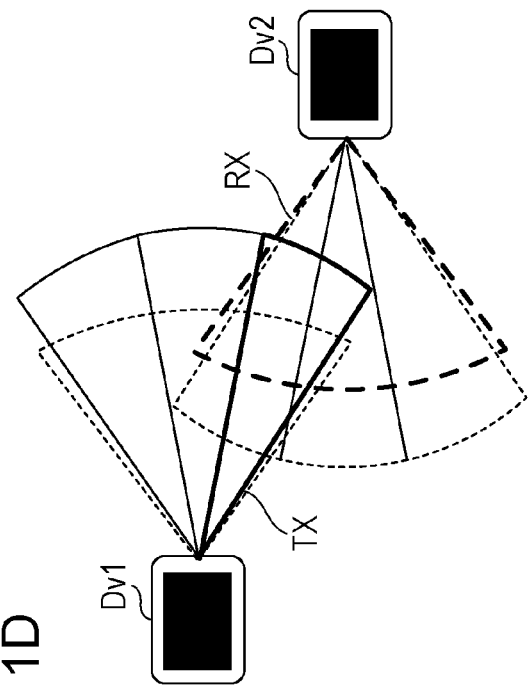
FIG. 1D is an explanatory diagram of a communication example when the beam pattern having directivity in a specific direction is set for a transmitting antenna of a data-transmitting wireless communication device, and the quasi-omnidirectional beam pattern is set for a receiving antenna of a data-receiving wireless communication device.
Figure 1A:
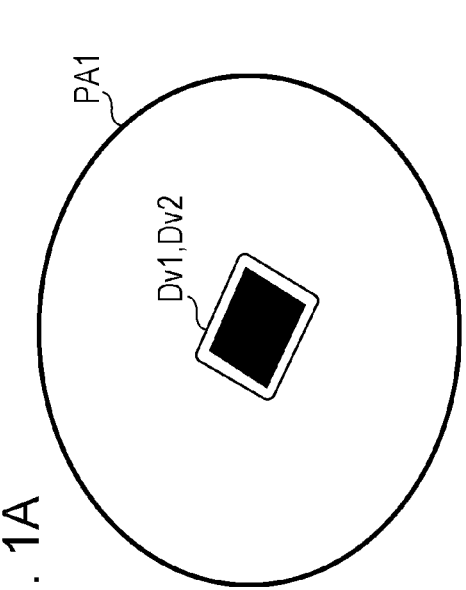
FIG. 1A is a diagram showing an omnidirectional beam pattern.

FIG. 1A is a diagram showing an omnidirectional beam pattern PA1. FIG. 1B is a diagram showing a quasi-omnidirectional beam pattern PA2. FIG. 4C is a beam pattern PA3 having a plurality of (for example, three) directivities and having a main beam formed in one of the directions. FIG. 1D is an explanatory diagram of a communication example of a case in which the beam pattern PA3 having directivity in a specific direction is set for the transmitting antenna of the data-transmitting wireless communication device Dv1 and the quasi-omnidirectional beam pattern PA2 is set for the receiving antenna of the data-receiving wireless communication device Dv2.

For transmitting or receiving a MAC frame or an aggregation frame, for example, the data-transmitting wireless communication device Dv1 and the data-receiving wireless communication device Dv2 set the beam pattern of each transmitting antenna or receiving antenna to the omnidirectional (omni) beam pattern PA1 (see FIG. 1A) or the quasi-omnidirectional (quasi-omni) beam pattern PA2.

A beam pattern directivity having a wide beam width of the data-transmitting wireless communication device Dv1 or the data-receiving wireless communication device Dv2 is hereinafter referred to as "quasi-omnidirectivity (quasi-omni)". Accordingly, in the quasi-omnidirectional beam pattern PA2, the arrival distance or reception distance of frames is small, but the beam width is large, compared with the beam pattern PA3 having the directivity in the specific direction shown in FIG. 1C.

Figure 1C:
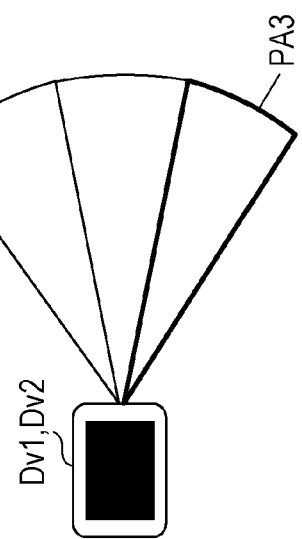
FIG. 1C is a diagram showing a beam pattern having a plurality of (for example, three) directivities and having a main beam formed in one of directions.

Also, for transmitting or receiving a MAC frame or an aggregation frame, the data-transmitting wireless communication device Dv1 and the data-receiving wireless communication device Dv2 can also set the beam pattern of each transmitting antenna or receiving antenna to the beam pattern PA3 having the main beam formed in a specific direction (see FIG. 1C).

When the transmitting antenna of the data-transmitting wireless communication device Dv1 is set to the beam pattern PA3 having the main beam formed in a specific direction, and the receiving antenna of the data-receiving wireless communication device Dv2 is set to the quasi-omnidirectional beam pattern PA2, for example, as shown in FIG. 1D, a MAC frame or an aggregation frame transmitted by the data-transmitting wireless communication device Dv1 is received by the data-receiving wireless communication device Dv2.

FIRST EMBODIMENT

In a first embodiment, a description will be given assuming a case in which, for example, the data-transmitting wireless communication device Dv1 transmits a MAC frame shown in FIG. 14A, and the data-receiving wireless communication device Dv2 makes a response with an Ack frame indicating that a MAC frame is received.

FIG. 2 is a block diagram showing one example of an internal basic configuration of a wireless communication device 1 in each embodiment. The wireless communication device 1 shown in FIG. 2 has a configuration aimed for, for example, a data-receiving wireless communication device that receives a MAC frame transmitted from another wireless communication device (for example, the data-transmitting wireless communication device Dv1 or the data-receiving wireless communication device Dv2), which is a communication partner, and that makes a response with an Ack frame indicating that a MAC frame is received.

Specifically, the wireless communication device 1 shown in FIG. 2 includes a wireless receiving unit 11 to which a receiving antenna ARX is connected, a response-needed/not-needed determining unit 12, a response-frame generating unit 13, a wireless transmitting unit 14 to which a transmitting antenna ATX is connected, a determining unit 15, and an antenna control unit 16.

Before the period PH2 (see FIG. 18A) of communication with the other wireless communication device (for example, the data-transmitting wireless communication device Dv1 or the data-receiving wireless communication device Dv2), which is a communication partner, is started, a beam pattern is set for the receiving antenna ARX in the setting period PH1 shown in FIG. 18A. That is, in response to an antenna control signal output by the antenna control unit 16, a beam pattern having a predetermined directivity is set for the receiving antenna ARX by a beamforming technique and is held.

Through use of the held beam pattern, the receiving antenna ARX receives a MAC frame (for example, a data frame) or an Ack frame transmitted by the other wireless communication device (for example, the data-transmitting wireless communication device Dv1 or the data-receiving wireless communication device Dv2) and outputs the MAC frame or Ack frame to the wireless receiving unit 11.

Also, in the period PH2 of communication with the other wireless communication device (for example, the data-transmitting wireless communication device Dv1 or the data-receiving wireless communication device Dv2), the beam pattern of the receiving antenna ARX is also changed by the beamforming technique and is held in accordance with an antenna control signal output by the antenna control unit 16.

Before the period PH2 (see FIG. 18A) of communication with the other wireless communication device (for example, the data-transmitting wireless communication device Dv1 or the data-receiving wireless communication device Dv2), which is a communication partner, is started, a beam pattern is set for the transmitting antenna ATX in the setting period PH1 shown in FIG. 18A. That is, a beam pattern having a predetermined directivity is set for the transmitting antenna ATX by the beamforming technique and is held in accordance with an antenna control signal output by the antenna control unit 16.

Through use of the held beam pattern, the transmitting antenna ATX transmits a MAC frame (for example, a data frame) or an Ack frame transmitted by the other wireless communication device (for example, the data-transmitting wireless communication device Dv1 or the data-receiving wireless communication device Dv2).

Also, in the period PH2 of communication with the other wireless communication device (for example, the data-transmitting wireless communication device Dv1 or the data-receiving wireless communication device Dv2), the beam pattern of the transmitting antenna ATX is also changed by the beamforming technique and is held in accordance with an antenna control signal output by the antenna control unit 16.

The wireless receiving unit 11 converts signals in the MAC frame or Ack frame in a carrier frequency band, the frame being received by the receiving antenna ARX, into baseband signals and demodulates the baseband signals. When a destination address (for example, see the Address 1 field shown in FIG. 14A) of the demodulated MAC frame or a receiving-station address (for example, see the RA (Receiver Address) field shown in FIG. 14D) of the demodulated Ack frame matches a MAC address of the local station, the wireless receiving unit 11 determines that the MAC frame or the Ack frame is a frame addressed to the local station.

After determining that the MAC frame or the Ack frame is a frame addressed to the local station, the wireless receiving unit 11 determines whether or not a value computed based on the contents of the MAC frame or the Ack frame and the value of the FCS match each other. When the wireless receiving unit 11 determines that the value computed based on the contents of the MAC frame or the Ack frame and the value of the FCS (for example, CRC32 (Cyclic Redundancy Code 32)) match each other, the wireless receiving unit 11 determines that the MAC frame or the Ack frame has been properly received.

After determining that the MAC frame or the Ack frame has been properly received, the wireless receiving unit 11 outputs the MAC frame or the Ack frame to the response-needed/not-needed determining unit 12 and the determining unit 15.

Also, when the wireless receiving unit 11 receives the MAC frame or the Ack frame but determines that it is not a MAC frame or Ack frame addressed to the local station or that the value computed based on the contents of the MAC frame or the Ack frame and the value of the FCS do no match each other, the wireless receiving unit 11 determines that a MAC frame or an Ack frame has not been properly received. The wireless receiving unit 11 discards the MAC frame or Ack frame and waits until a next reception.

On the basis of a frame type (for example, see the Type or the Subtype field shown in FIG. 14C or a response type (for example, see the QoS control field shown in FIG. 14A) of the MAC frame demodulated by the wireless receiving unit 11, the response-needed/not-needed determining unit 12 determines whether or not a response with an Ack frame indicating that the MAC frame is received is needed.

The response-needed/not-needed determining unit 12 outputs the MAC frame demodulated by the wireless receiving unit 11 to an upper layer (not shown) of the wireless communication device 1 and outputs, to the response-frame generating unit 13, the determining unit 15, and the antenna control unit 16, a result of the determination as to whether or not a response with an Ack frame is needed. When the response-needed/not-needed determining unit 12 determines that a response with an Ack frame is not needed, the wireless communication device 1 does not make a response with an Ack frame indicating that the MAC frame has been received.

When the response-needed/not-needed determining unit 12 determines that a response with an Ack frame is needed, the response-frame generating unit 13 generates an Ack frame indicating that the MAC frame has been received and outputs the Ack frame to the wireless transmitting unit 14.

The wireless transmitting unit 14 converts the Ack frame generated by the response-frame generating unit 13 into signals in a predetermined carrier frequency band and transmits the signals via the transmitting antenna ATX. When a predetermined specified time (for example, SIFS: Short Inter Frame Space in IEEE802.11) passes after a point in time when a MAC frame is received by the receiving antenna ARX, the wireless transmitting unit 14 makes a response with an Ack frame. Thus, the wireless communication device 1 can inform the communication partner that the MAC frame transmitted from the communication partner has been properly received.

When the response-needed/not-needed determining unit 12 determines that a response with an Ack frame is needed, the determining unit 15 determines whether or not the same MAC frame has been retransmitted from the communication partner, on the basis of the MAC frame demodulated by the wireless receiving unit 11. The determining unit 15 is configured using, for example, a retransmission-bit determining unit 15A in a wireless communication device 1A shown in FIG. 3A or an SN determining unit 15B in a wireless communication device 1B shown in FIG. 3B.

Figure 3A:
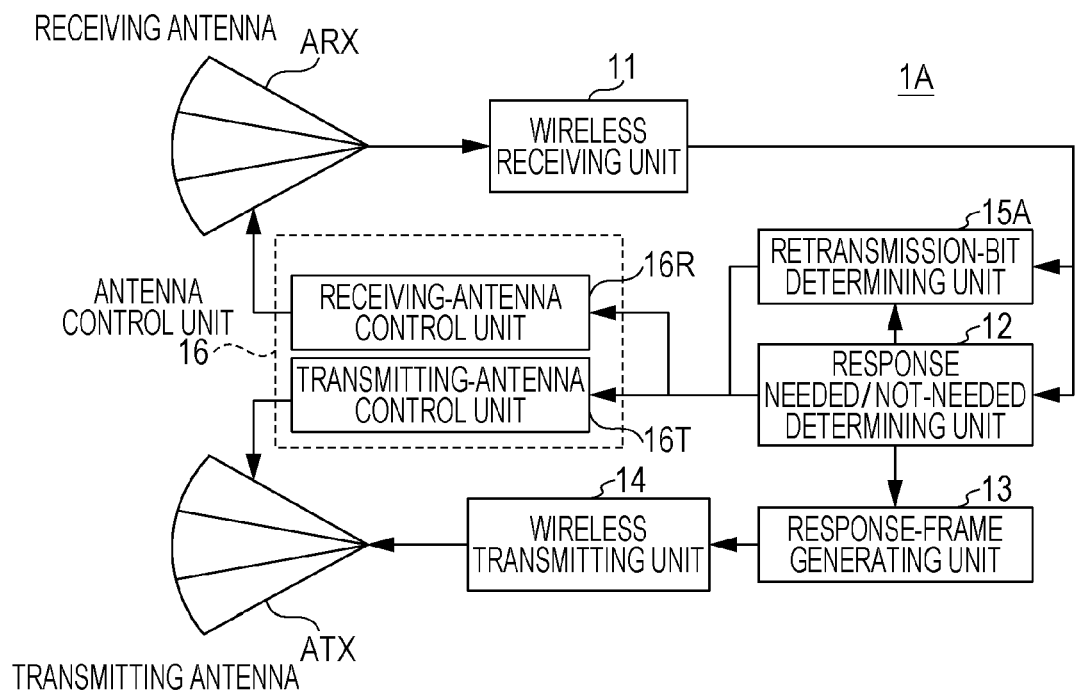
FIG. 3A is a block diagram showing one example of an internal configuration of a wireless communication device that uses a retransmission-bit determining unit as one example of a determining unit in the wireless communication device shown in FIG. 2.
Figure 3B:
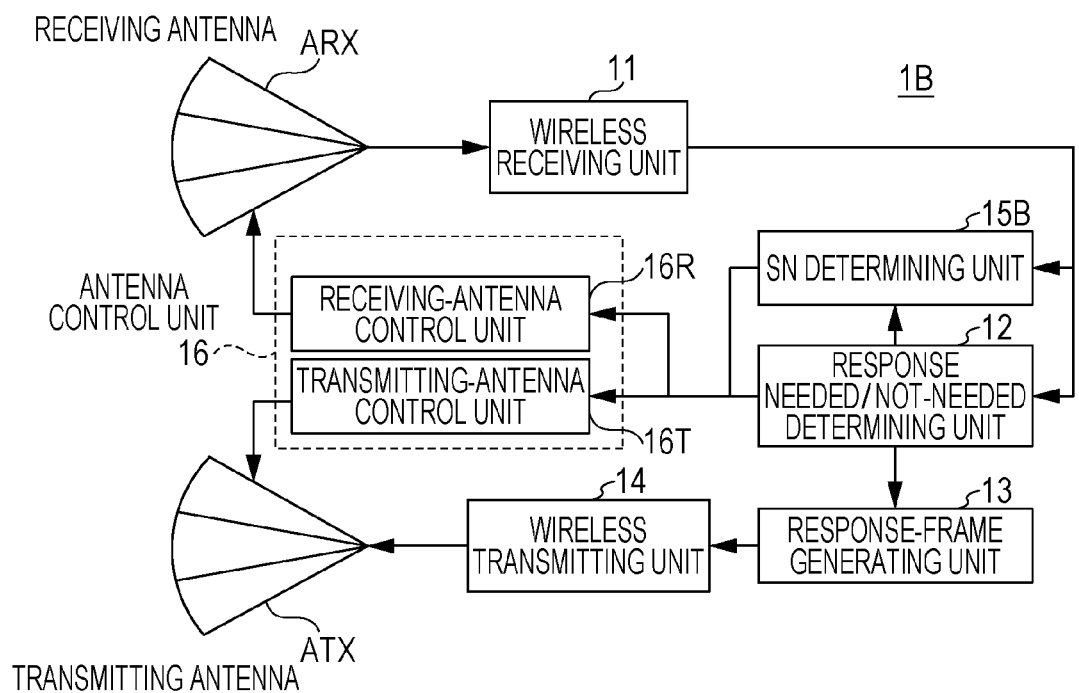
FIG. 3B is a block diagram showing one example of an internal configuration of a wireless communication device that uses an SN determining unit as one example of the determining unit in the wireless communication device shown in FIG. 2.

FIG. 3A is a block diagram showing one example of an internal configuration of the wireless communication device 1A that uses the retransmission-bit determining unit 15A as one example of the determining unit 15 in the wireless communication device 1 shown in FIG. 2. FIG. 3B is a block diagram showing one example of an internal configuration of the wireless communication device 1B that uses the SN determining unit 15B as one example of the determining unit 15 in the wireless communication device 1 shown in FIG. 2.

The retransmission-bit determining unit 15A in the wireless communication device 1A determines whether the retry bit in the retry field (for example, the "retry" shown in FIG. 14A) in a MAC frame demodulated by a wireless receiving unit 11 is 1 indicating retransmission or 0 indicating new transmission, and outputs a result of the determination to a transmitting-antenna control unit 16T in an antenna control unit 16.

In this case, since the data-receiving wireless communication device Dv2 has properly received a MAC frame, it can be determined that beam patterns set in the setting period PH1 are effective, specifically the beam patterns of the transmitting antenna ATX of the data-transmitting wireless communication device Dv1 and the receiving antenna ARX of the data-receiving wireless communication device Dv2.

In contrast, since the retry bit in the received MAC frame is 1, this means that the MAC frame was retransmitted one or more times from the data-transmitting wireless communication device Dv1, which is a communication partner, before the data-receiving wireless communication device Dv2 has properly received the MAC frame, and the data-receiving wireless communication device Dv2 returned an Ack frame indicating proper reception of a MAC frame but the returned Ack frame has not been properly received by the data-transmitting wireless communication device Dv1, which is a communication partner.

In this case, the beam pattern of the transmitting antenna ATX of the data-receiving wireless communication device Dv2 used for returning the Ack frame and the beam pattern of the receiving antenna ARX of the data-transmitting wireless communication device Dv1, the beam patterns being set in the setting period PH1, are thought to be not appropriate.

The SN determining unit 15B in the wireless communication device 1B determines whether or not the sequence number in the sequence control field in a MAC frame demodulated by the wireless receiving unit 11 and the sequence number in the sequence control field in a MAC frame previously received and demodulated by the wireless receiving unit 11 are the same and outputs a result of the determination to the transmitting-antenna control unit 16T in the antenna control unit 16.

That is, when a MAC frame having the same sequence number has been received a plurality of times before the count of a finite number of sequence numbers reaches its full count, this means that the data-receiving wireless communication device Dv2 has redundantly received the same MAC frame, that is, the same MAC frame has been retransmitted from the data-transmitting wireless communication device Dv1, which is a communication partner.

Thus, it can be determined that the beam patterns set in the setting period PH1 are effective for the beam patterns of the transmitting antenna ATX of the data-transmitting wireless communication device Dv1 and the antenna ARX of the data-receiving wireless communication device Dv2.

In contrast, the beam patterns of the transmitting antenna ATX of the data-receiving wireless communication device Dv2 used for returning the Ack frame and the receiving antenna ARX of the data-transmitting wireless communication device Dv1, the beam patterns being set in the setting period PH1, are thought to be not appropriate.

The SN determining unit 15B manages the sequence numbers in association with each of all or some pairs each consisting of a destination address (for example, see address 1 in FIG. 14A) or a receiving-station address (for example, see RA shown in FIG. 14D) and a TID (Traffic Identifier) representing an identifier of a logical link.

Also, the SN determining unit 15B stores the sequence numbers of MAC frames previously received by the wireless communication device 1B. Hereinafter, for ease of description of the present embodiment, the sequence number of a MAC frame previously received and stored by the SN determining unit 15B is simply referred to as a "stored SN", and the sequence number of a MAC frame received via the receiving antenna ARX is simply referred to as a "received SN".

The antenna control unit 16 includes the transmitting-antenna control unit 16T and a receiving-antenna control unit 16R. Although the antenna control unit 16 shown in FIG. 2 will be described as including the transmitting-antenna control unit 16T and the receiving-antenna control unit 16R shown in FIG. 3A or FIG. 3B, the antenna control unit 16 may also control the beam patterns of the transmitting antenna ATX and the receiving antenna ARX.

Before starting the period PH2 (see FIG. 18A) of communication with a communication partner, the transmitting-antenna control unit 16T sets and holds the beam pattern of the transmitting antenna ATX in the setting period PH1.

When the retransmission-bit determining unit 15A determines that the retry bit in the retry field in a MAC frame is 1, that is, determines that an initial transmission or retransmission of the same MAC frame has been previously performed, the transmitting-antenna control unit 16T changes the beam pattern of the transmitting antenna ATX which is to be used for a response with an Ack frame.

When the retransmission-bit determining unit 15A determines that the retry bit in the retry field in a MAC frame is 0, that is, determines that an initial transmission of a new MAC frame has been received, the transmitting-antenna control unit 16T holds the beam pattern of the transmitting antenna ATX which was set in the setting period PH1 and which is used for a response with an Ack frame.

When the response-needed/not-needed determining unit 12 determines that a response with an Ack frame is not needed, the transmitting-antenna control unit 16T holds the beam pattern of the transmitting antenna ATX which was set in the setting period PH1.

Before starting the period PH2 (see FIG. 18A) of communication with the communication partner, the receiving-antenna control unit 16R sets and holds the beam pattern of the receiving antenna ARX in the setting period PH1. Although details are described below, the receiving-antenna control unit 16R may also change or hold the beam pattern of the receiving antenna ARX in accordance with a result of the determination made by the response-needed/not-needed determining unit 12, the retransmission-bit determining unit 15A, or the SN determining unit 15B.

Next, an operation procedure from when the wireless communication device 1 in the present embodiment receives a MAC frame until it transmits an Ack frame will be described with reference to FIG. 4A and FIG. 4B.

Figure 4A:
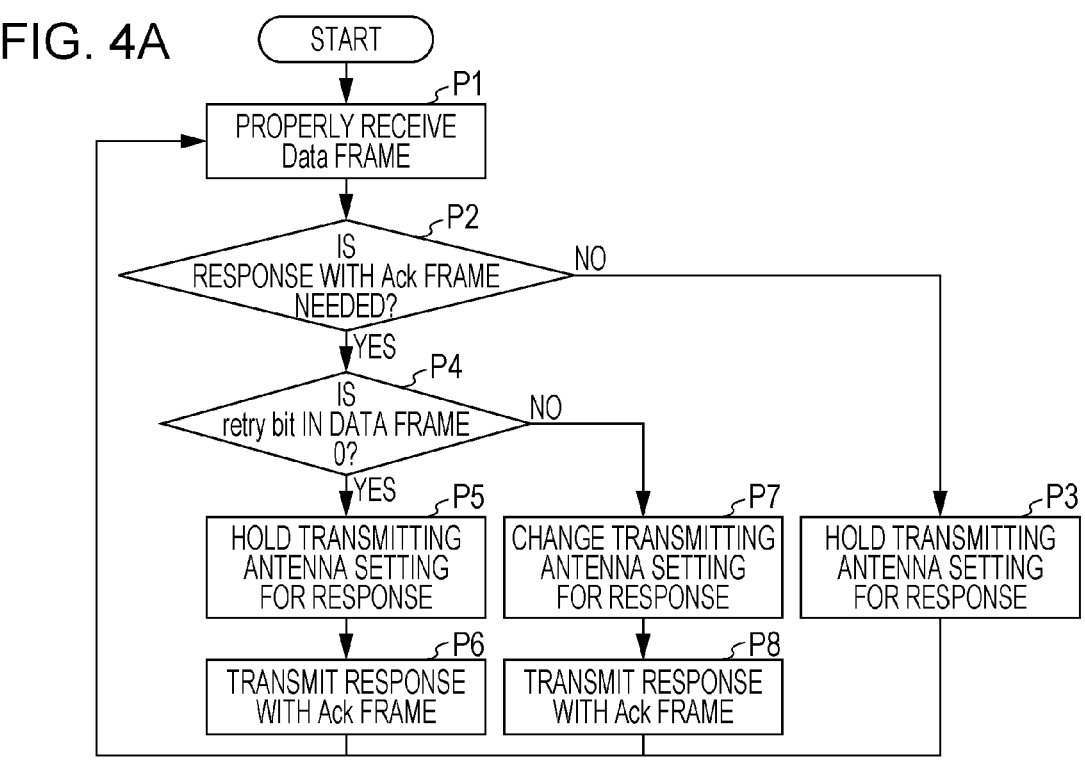
FIG. 4A is a flowchart illustrating one example of a procedure for setting the beam pattern of the transmitting antenna for an Ack frame in response to a MAC frame (for example, a data frame) received by a data-receiving wireless communication device in a first embodiment.

FIG. 4A is a flowchart illustrating one example of a procedure for setting the beam pattern of the transmitting antenna ATX for an Ack frame in response to a MAC frame (for example, a data frame) received by the data-receiving wireless communication device Dv2 in the first embodiment. FIG. 4B is a flowchart illustrating another example of the procedure for setting the beam pattern of the transmitting antenna ATX for an Ack frame in response to a MAC frame (for example, a data frame) received by the data-receiving wireless communication device Dv2 in the first embodiment.

A description in FIG. 4A will be given assuming that the wireless communication device 1A (the data-receiving wireless communication device Dv2) shown in FIG. 3A has properly received a MAC frame (for example, a data frame), and a description in FIG. 4B will be given assuming that the wireless communication device 1B (the data-receiving wireless communication device Dv2) shown in FIG. 3B has properly received a MAC frame (for example, a data frame) (P1).

In FIG. 4A, the response-needed/not-needed determining unit 12 determines whether or not a response with an Ack frame indicating proper reception of the MAC frame is needed, on the basis of the frame type or response type of the MAC frame demodulated by the wireless receiving unit 11 (P2). The response-needed/not-needed determining unit 12 outputs a result of the determination to the response-frame generating unit 13, the retransmission-bit determining unit 15A, and the transmitting-antenna control unit 16T.

When the response-needed/not-needed determining unit 12 determines that a response with an Ack frame is not needed (P2, NO), the transmitting-antenna control unit 16T holds the beam pattern of the transmitting antenna ATX (P3).

When the response-needed/not-needed determining unit 12 determines that a response with an Ack frame is needed (P2, YES), the response-frame generating unit 13 generates an Ack frame indicating reception of the MAC frame and outputs the Ack frame to the wireless transmitting unit 14.

When the response-needed/not-needed determining unit 12 determines that a response with an Ack frame is needed (P2, YES), the retransmission-bit determining unit 15A determines whether the retry bit in the retry field in the MAC frame demodulated by the wireless receiving unit 11 is 1 indicating retransmission or 0 indicating new transmission (P4). The retransmission-bit determining unit 15A outputs a result of the determination to the transmitting-antenna control unit 16T.

When the retransmission-bit determining unit 15A determines that the retry bit in the retry field in the MAC frame is 0 (P4, YES), the transmitting-antenna control unit 16T holds the beam pattern of the transmitting antenna ATX which is to be used for a response with an Ack frame (P5).

By using the beam pattern of the transmitting antenna ATX which was held in step P5, the wireless transmitting unit 14 transmits an Ack frame generated by the response-frame generating unit 13 to the communication partner (P6).

On the other hand, when the retransmission-bit determining unit 15A determines that the retry bit in the retry field in the MAC frame is 1 (P4, NO), the transmitting-antenna control unit 16T changes the beam pattern of the transmitting antenna ATX which is to be used for a response with an Ack frame (P7).

The wireless transmitting unit 14 uses the beam pattern of the transmitting antenna ATX after the change in step P7 to transmit an Ack frame generated by the response-frame generating unit 13 to the communication partner (P8). The operation of the wireless communication device 1A after step P3, step P6, or step P8 returns to step P1.

Next, an operation procedure from when the wireless communication device 1B receives a MAC frame until it makes a response with an Ack frame will be described with reference to FIG. 4B, in which descriptions for operations that are the same as the operations shown in FIG. 4A are omitted or briefly given with the same step numbers given thereto, and different details will be described.

Figure 4B:
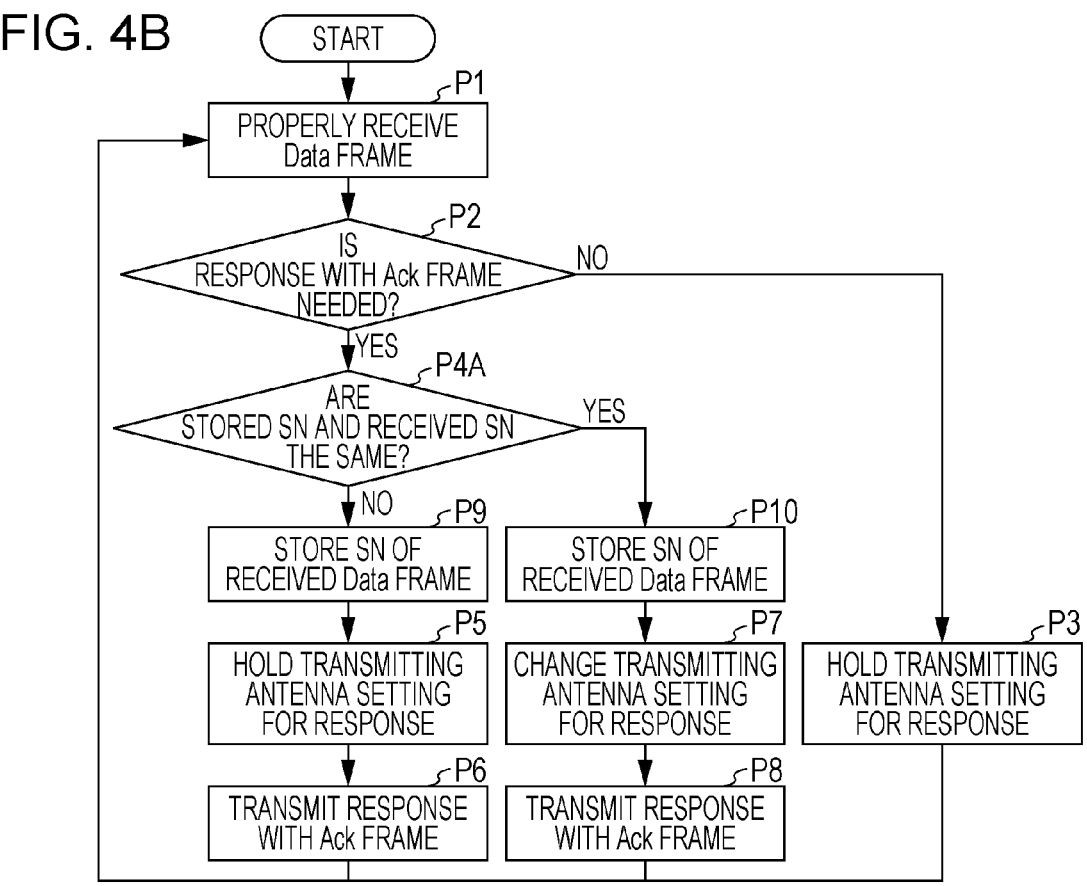
FIG. 4B is a flowchart illustrating another example of the procedure for setting the beam pattern of the transmitting antenna for an Ack frame in response to a MAC frame (for example, a data frame) received by the data-receiving wireless communication device in the first embodiment.

In FIG. 4B, when the response-needed/not-needed determining unit 12 determines that a response with an Ack frame is needed (P2, YES), the SN determining unit 15B determines whether or not a stored SN and the received SN are the same (P4A). Regardless of a result of the determination in step P4A, the SN determining unit 15B stores the received SN (P9, P10).

When the SN determining unit 15B determines that the stored SN and the received SN do not match each other, the transmitting-antenna control unit 16T holds, after step P9, the beam pattern of the transmitting antenna ATX which is to be used for a response with an Ack frame (P5).

When the stored SN and the received SN do not match each other, this means that the wireless communication device 1B received a MAC frame given a new sequence number. Accordingly, the wireless communication device 1B determines that the beam pattern of the transmitting antenna ATX which was used for the previous response with an Ack frame is appropriate and it is not necessary to change the beam pattern of the transmitting antenna ATX.

On the other hand, when the SN determining unit 15B determines that the stored SN and the received SN match each other, the transmitting-antenna control unit 16T changes, after step P9, the beam pattern of the transmitting antenna ATX which is to be used for a response with an Ack frame (P7).

When the stored SN and the received SN match each other, this means that the wireless communication device 1B received a MAC frame given the same sequence number. Accordingly, the wireless communication device 1B determines that the beam pattern of the transmitting antenna ATX which was used for the previous response with an Ack frame is inappropriate and it is necessary to change the beam pattern of the transmitting antenna ATX.

Next, one example of signaling when the wireless communication devices in the present embodiment directly perform wireless communication will be described with reference to FIG. 5A, FIG. 5B, FIG. 6A, and FIG. 6B. In descriptions in FIG. 5B, FIG. 6A, and FIG. 6B, descriptions for operations that are the same as the operations shown in FIG. 5A are omitted or briefly given with the same numerals given thereto, and different details will be described.

FIG. 5A is a sequence diagram showing one example of signaling in which a sequence number SN is changed upon reception of an Ack frame, the signaling being performed by the data-transmitting wireless communication device and the data-receiving wireless communication device in the first embodiment. FIG. 5B is a sequence diagram showing one example of signaling in which a sequence number SN is changed upon reaching of the upper limit of the number of retransmissions, the signaling being performed by the data-transmitting wireless communication device and the data-receiving wireless communication device in the first embodiment.

FIG. 6A is a sequence diagram showing another example of signaling in which a sequence number SN is changed upon reception of an Ack frame, the signaling being performed by the data-transmitting wireless communication device and the data-receiving wireless communication device in the first embodiment. FIG. 6B is a sequence diagram showing another example of signaling in which a sequence number SN is changed upon reaching of the upper limit of the number of retransmissions, the signaling being performed by the data-transmitting wireless communication device and the data-receiving wireless communication device in the first embodiment.

In the sequence diagrams below, a wireless communication device that transmits data in the present embodiment is described as a data-transmitting wireless communication device Dv1, and a wireless communication device that receives data in the present embodiment is described as a data-receiving wireless communication device Dv2.

Also, FIG. 5A and FIG. 5B show operations of the data-transmitting wireless communication device Dv1 and the data-receiving wireless communication device Dv2 having the configuration of the wireless communication device 1A shown in FIG. 3A, and FIG. 6A and FIG. 6B show operations of the data-transmitting wireless communication device Dv1 and the data-receiving wireless communication device Dv2 having the configuration of the wireless communication device 1B shown in FIG. 3B.

In FIG. 5A, the data-transmitting wireless communication device Dv1 transmits the MAC frame (for example, a data frame) "sequence number=1 and retry bit=0" to the data-receiving wireless communication device Dv2 (S1). The data-receiving wireless communication device Dv2 properly receives the MAC frame transmitted from the data-transmitting wireless communication device Dv1 and uses the beam pattern (for example, PtA) of the transmitting antenna ATX to transmit an Ack frame to the data-transmitting wireless communication device Dv1 (S1). However, in step S1, the Ack frame does not arrive at the data-transmitting wireless communication device Dv1 (S1).

The data-transmitting wireless communication device Dv1 changes the retry bit from 0 to 1 and retransmits the data frame "sequence number=1 and retry bit=1" (S2). The data-receiving wireless communication device Dv2 properly receives the data frame retransmitted from the data-transmitting wireless communication device Dv1, changes the beam pattern of the transmitting antenna ATX, for example, from the beam pattern PtA to a beam pattern PtB, and transmits an Ack frame to the data-transmitting wireless communication device Dv1 (S2).

Since the Ack frame transmitted from the data-receiving wireless communication device Dv2 in step S2 arrives at the data-transmitting wireless communication device Dv1, that is, is properly received by the data-transmitting wireless communication device Dv1, the data-transmitting wireless communication device Dv1 increments the sequence number by, for example, 1 (S3), generates a data frame "sequence number=2 and retry bit=0", and transmits the data frame to the data-receiving wireless communication device Dv2 (S4).

The data-receiving wireless communication device Dv2 properly receives the data frame transmitted from the data-transmitting wireless communication device Dv1 in step S4 and uses the beam pattern PtB of the transmitting antenna ATX after the change in step S2 to transmit an Ack frame to the data-transmitting wireless communication device Dv1 (S4).

The Ack frame transmitted in step S4 is properly received by the data-transmitting wireless communication device Dv1, as long as the communication environment between the data-transmitting wireless communication device Dv1 and the data-receiving wireless communication device Dv2 and the beam patterns of the antennas are appropriate.

In FIG. 5B, the data-transmitting wireless communication device Dv1 retransmits the data frame "sequence number=1 and retry bit=1" (S5). The data-receiving wireless communication device Dv2 properly receives the data frame retransmitted from the data-transmitting wireless communication device Dv1, changes the beam pattern of the transmitting antenna ATX, for example, from a beam pattern PtA to a beam pattern PtB, and transmits an Ack frame to the data-transmitting wireless communication device Dv1 (S5). However, in step S5, the Ack frame does not arrive at the data-transmitting wireless communication device Dv1 (S5).

In step S6, similarly, the data-receiving wireless communication device Dv2 also changes the beam pattern of the transmitting antenna ATX, for example, from the beam pattern PtB to a beam pattern PtC and transmits an Ack frame to the data-transmitting wireless communication device Dv1 (S6). However, in step S6, the Ack frame does not arrive at the data-transmitting wireless communication device Dv1 (S6).

When the data-transmitting wireless communication device Dv1 determines that the number of retransmissions of the data frame reaches a predetermined upper limit of the number of retransmissions, the data-transmitting wireless communication device Dv1 suspends the retransmission of the data frame "sequence number=1", although the data frame "sequence number=1" is properly received by the data-receiving wireless communication device Dv2 in practice, increments the sequence number by 1 to change the sequence number (S7), and transmits a data frame "sequence number=2 and retry bit=0" to the data-receiving wireless communication device Dv2 (S8).

The data-receiving wireless communication device Dv2 properly receives the data frame "sequence number=2 and retry bit=0" transmitted from the data-transmitting wireless communication device Dv1 and uses, for example, the beam pattern PtC set in step S6 as the beam pattern of the transmitting antenna ATX to transmit an Ack frame to the data-transmitting wireless communication device Dv1 (S8). However, in step Sb, the Ack frame does not arrive at the data-transmitting wireless communication device Dv1 (S8).

In step S8, the data-receiving wireless communication device Dv2 uses, as the beam pattern of the transmitting antenna ATX, the same beam pattern PtC as that in step S6 to transmit the Ack frame. That is, since the determination in step S7 made by the data-transmitting wireless communication device Dv1 is unknown to the data-receiving wireless communication device Dv2, it is difficult for the data-receiving wireless communication device Dv2 to make the determination in step S8 as to whether the change of the sequence number to 2 is caused by the arrival of the Ack frame or by the reaching of the upper limit of the number of retransmissions in step S7.

Thus, the data-receiving wireless communication device Dv2 uses, in step S8, the procedure to re-check whether or not the transmission with the beam pattern PtC arrives, by using the same beam pattern as that in step S6 as the beam pattern used for transmitting the Ack frame. With this procedure, in step S8, it is possible to reduce unnecessary periods due to checking with all beam patterns.

The data-transmitting wireless communication device Dv1 changes the retry bit from 0 to 1 and retransmits the data frame "sequence number=2 and retry bit=1" (S9). The data-receiving wireless communication device Dv2 properly receives the data frame retransmitted from the data-transmitting wireless communication device Dv1, changes the beam pattern of the transmitting antenna ATX, for example, from the beam pattern PtC to a beam pattern PtD, and transmits an Ack frame to the data-transmitting wireless communication device Dv1 (S9). The Ack frame transmitted in step S9 is properly received by the data-transmitting wireless communication device Dv1, as long as the communication environment between the data-transmitting wireless communication device Dv1 and the data-receiving wireless communication device Dv2 and the beam patterns of the antennas are appropriate.

In the sequence diagrams in FIG. 6A and FIG. 6B, the method for the data-receiving wireless communication device Dv2 to determine whether or not the same data frame has been retransmitted is different from that in the sequence diagrams in FIG. 5A and FIG. 5B, the details other than the determination method are the same, and thus descriptions thereof are omitted.

That is, in FIG. 6A and FIG. 6B, when the data-receiving wireless communication device Dv2 properly receives a data frame transmitted from the data-transmitting wireless communication device Dv1 and determines that a response with an Ack frame is needed, the data-receiving wireless communication device Dv2 transmits an Ack frame by using the set beam pattern of the transmitting antenna ATX, upon determining that the stored SN and the received SN are not the same.

Next, one example of the beam pattern of each antenna when the wireless communication devices in the present embodiment directly perform wireless communication will be described with reference to FIG. 7A, FIG. 7B, FIG. 7C, FIG. 7D, FIG. 7E, and FIG. 7F.

Figure 7A:
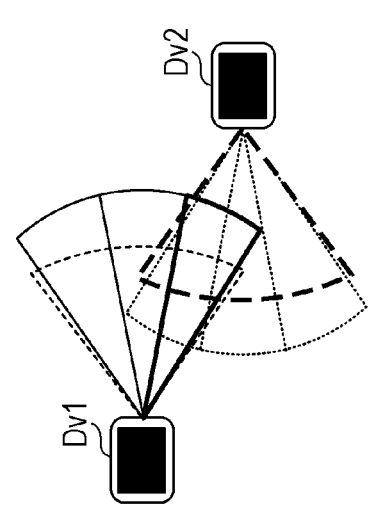
FIG. 7A is an explanatory diagram showing an example in which transmission of a data frame from the data-transmitting wireless communication device to the data-receiving wireless communication device has succeeded after the beam pattern was determined.
Figure 7B:
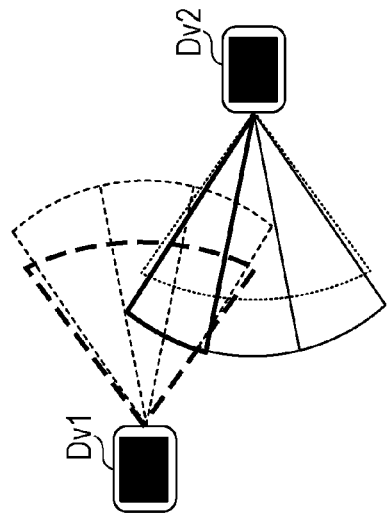
FIG. 7B is an explanatory diagram showing an example in which transmission of an Ack frame from the data-receiving wireless communication device to the data-transmitting wireless communication device has succeeded after the beam pattern was determined.

FIG. 7A is an explanatory diagram showing an example in which transmission of a data frame from the data-transmitting wireless communication device Dv1 to the data-receiving wireless communication device Dv2 has succeeded after the beam pattern was determined. FIG. 7B is an explanatory diagram showing an example in which transmission of an Ack frame from the data-receiving wireless communication device Dv2 to the data-transmitting wireless communication device Dv1 has succeeded after the beam pattern was determined.

Figure 7C:
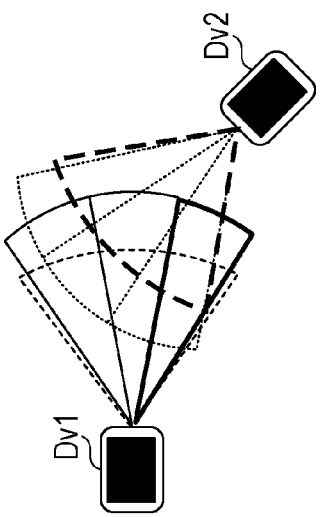
FIG. 7C is an explanatory diagram showing an example in which transmission of a data frame from the data-transmitting wireless communication device to the data-receiving wireless communication device has succeeded after the data-receiving wireless communication device was rotated.
Figure 7D:
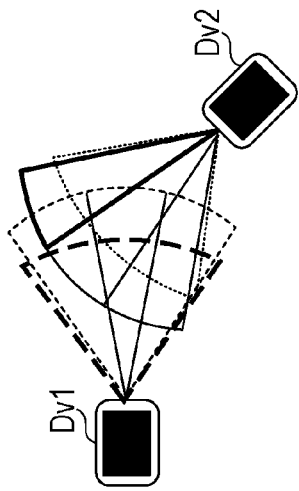
FIG. 7D is an explanatory diagram showing an example in which transmission of an Ack frame from the data-receiving wireless communication device to the data-transmitting wireless communication device has failed after the data-receiving wireless communication device was rotated.

FIG. 7C is an explanatory diagram showing an example in which transmission of a data frame from the data-transmitting wireless communication device Dv1 to the data-receiving wireless communication device Dv2 has succeeded after the data-receiving wireless communication device Dv2 was rotated. FIG. 7D is an explanatory diagram showing an example in which transmission of an Ack frame from the data-receiving wireless communication device Dv2 to the data-transmitting wireless communication device Dv1 has failed after the data-receiving wireless communication device Dv2 was rotated.

Figure 7E:
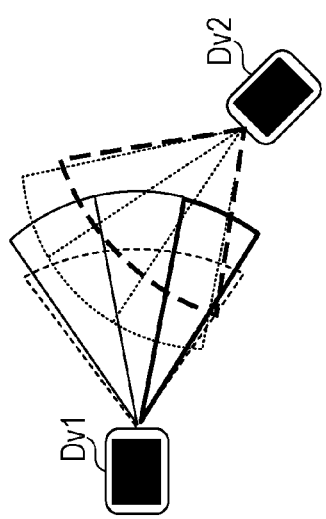
FIG. 7E is an explanatory diagram showing an example in which transmission of a data frame from the data-transmitting wireless communication device to the data-receiving wireless communication device has succeeded after the data-receiving wireless communication device was rotated.
Figure 7F:
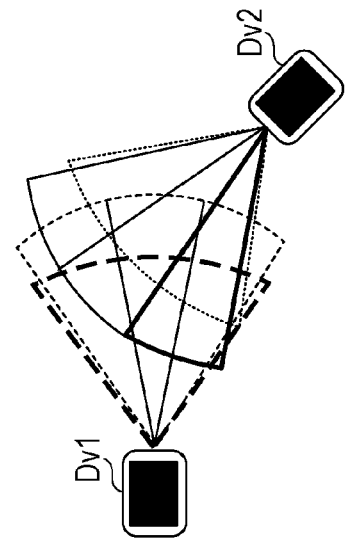
FIG. 7F is an explanatory diagram showing an example in which transmission of an Ack frame from the data-receiving wireless communication device to the data-transmitting wireless communication device has succeeded after the data-receiving wireless communication device was rotated and the beam pattern of the transmitting antenna was changed.

FIG. 7E is an explanatory diagram showing an example in which transmission of a data frame from the data-transmitting wireless communication device Dv1 to the data-receiving wireless communication device Dv2 has succeeded after the data-receiving wireless communication device Dv2 was rotated. FIG. 7F is an explanatory diagram showing an example in which transmission of an Ack frame from the data-receiving wireless communication device Dv2 to the data-transmitting wireless communication device Dv1 has succeeded after the data-receiving wireless communication device Dv2 was rotated and the beam pattern of the transmitting antenna ATX was changed.

In FIG. 7A, FIG. 7C, and FIG. 7E, the beam pattern of the transmitting antenna ATX of the data-transmitting wireless communication device Dv1 is denoted by a thick solid line, and the beam pattern of the receiving antenna ARX of the data-receiving wireless communication device Dv2 is denoted by a thick dotted line. In FIG. 7B, FIG. 7D, and FIG. 7F, the beam pattern of the receiving antenna ARX of the data-transmitting wireless communication device Dv1 is denoted by a thick dotted line, and the beam pattern of the transmitting antenna ATX of the data-receiving wireless communication device Dv2 is denoted by a thick solid line.

In FIG. 7A and FIG. 7B, a combination of the beam pattern of the transmitting antenna ATX of the data-transmitting wireless communication device Dv1 and the beam pattern of the receiving antenna ARX of the data-receiving wireless communication device Dv2 has an overlapping portion. Thus, in FIG. 7A, a data frame transmitted by the data-transmitting wireless communication device Dv1 is received by the data-receiving wireless communication device Dv2. Also, in FIG. 7B, a combination of the beam pattern of the receiving antenna ARX of the data-transmitting wireless communication device Dv1 and the beam pattern of the transmitting antenna ATX of the data-receiving wireless communication device Dv2 has an overlapping portion. Thus, an Ack frame transmitted by the data-receiving wireless communication device Dv2 is received by the data-transmitting wireless communication device Dv1.

In FIG. 7C, since the data-receiving wireless communication device Dv2 was rotated, the overlapping state of the beam pattern of the receiving antenna ARX of the data-receiving wireless communication device Dv2 and the beam pattern of the transmitting antenna ATX changes. In FIG. 7C, a combination of the beam pattern of the transmitting antenna ATX of the data-transmitting wireless communication device Dv1 and the beam pattern of the receiving antenna ARX of the data-receiving wireless communication device Dv2 has an overlapping portion. Thus, a data frame transmitted by the data-transmitting wireless communication device Dv1 is received by the data-receiving wireless communication device Dv2.

However, in FIG. 7D, the combination of the beam pattern of the receiving antenna ARX of the data-transmitting wireless communication device Dv1 and the beam pattern of the transmitting antenna ATX of the data-receiving wireless communication device Dv2 has no overlapping. Thus, an Ack frame transmitted by the data-receiving wireless communication device Dv2 is not received by the data-transmitting wireless communication device Dv1, and the data-receiving wireless communication device Dv2 changes the beam pattern of the transmitting antenna ATX which is to be used for transmitting the Ack frame.

Descriptions in FIG. 7E and FIG. 7F are given of states in which the data-receiving wireless communication device Dv2 was rotated, as in FIG. 7C and FIG. 7D. In FIG. 7E, the combination of the beam pattern of the transmitting antenna ATX of the data-transmitting wireless communication device Dv1 and the beam pattern of the receiving antenna ARX of the data-receiving wireless communication device Dv2 has an overlapping portion. A data frame transmitted by the data-transmitting wireless communication device Dv1 is received by the data-receiving wireless communication device Dv2.

In FIG. 7F, since the beam pattern in FIG. 7D has been changed, the combination of the beam pattern of the receiving antenna ARX of the data-transmitting wireless communication device Dv1 and the beam pattern of the transmitting antenna ATX of the data-receiving wireless communication device Dv2 has an overlapping portion. Thus, when the data-receiving wireless communication device Dv2 transmits an Ack frame by using the changed beam pattern of the transmitting antenna ATX, the Ack frame transmitted by the data-receiving wireless communication device Dv2 is received by the data-transmitting wireless communication device Dv1.

As described above, the wireless communication device 1 in the present embodiment properly receives a MAC frame (for example, a data frame) transmitted from a communication partner, and upon determining that a response with an Ack frame indicating a response to the MAC frame is needed, the wireless communication device 1 determines whether or not the same MAC frame is retransmitted from the communication partner, in accordance with the contents of the retry bit in the MAC frame or through comparison of the stored SN with the received SN.

When the wireless communication device 1 determines that the same MAC frame is retransmitted from the communication partner, it determines that the beam pattern of the transmitting antenna ATX which was used for transmitting the previously transmitted Ack frame was not appropriate, and changes the beam pattern of the transmitting antenna ATX. The wireless communication device 1 uses the changed beam pattern to transmit an Ack frame.

Thus, the wireless communication device 1 does not change the beam pattern of the transmitting antenna ATX which is to be used for transmitting the Ack frame, when the same MAC frame is not retransmitted from the communication partner, and changes the beam pattern of the transmitting antenna ATX, when the same MAC frame is retransmitted. Thus, it is possible to avoid an unnecessary change of the beam pattern of the transmitting antenna ATX. Accordingly, since the wireless communication device 1 can quickly restore a communication channel, it is possible to suppress deterioration of the environment of communication (the quality of communication) with a communication partner. That is, since the wireless communication device 1 can reduce an unnecessary occupancy time in a communication band, it is possible to improve the effective throughput and it is possible to further reduce the power consumption and the time taken for connection to a communication partner.

Also, in the present embodiment, the wireless communication device 1 can determine whether or not the same MAC frame is retransmitted from the communication partner, on the basis of the sequence numbers of MAC frames, and thus supports, for example, MAC frames having formats that do not include retry bits, making it possible to determine whether or not a MAC frame is retransmitted. When the wireless communication device 1 receives, a plurality of times or more in a certain amount of time, a MAC frame having the same transmission-source address and indicating that it is retransmitted, the wireless communication device 1 may determine that a previously transmitted Ack frame has not arrived.

Also, for example, in the communication period PH2 after a predetermined certain period has passed from the completion of the setting period PH1 shown in FIG. 18A, even when the retry bit in a MAC frame transmitted from the communication partner is 0, the wireless communication device 1 may change the beam pattern of the transmitting antenna ATX which is to be used for transmitting an Ack frame.

For example, in the communication period PH2 after a predetermined certain period has passed from the completion of the setting period PH1 shown in FIG. 18A, there are cases in which the communication environment has deteriorated compared with the communication environment at the time of start of the communication period PH2. Accordingly, by changing the beam pattern of the transmitting antenna ATX which is to be used for transmitting an Ack frame, the wireless communication device 1 can quickly restore a communication channel with a communication partner.

The predetermined certain period is, for example, the time with which the wireless communication device 1 increments the sequence number of a MAC frame by 1. This allows the wireless communication device 1 to accurately distinguish between the quick increment processing for the sequence number upon arrival of an Ack frame at the communication partner and the increment processing for the sequence number when a certain time has passed after a MAC frame is retransmitted because of non-arrival of an Ack frame. Thus, the wireless communication device 1 can make a high-accuracy determination as to retransmission of the same MAC frame and can further appropriately change the beam pattern of the transmitting antenna ATX.

Next, in the present embodiment, when the retry bit in a MAC frame (for example, a data frame) received from the communication partner to the wireless communication device 1 is 0 or when the sequence number thereof changes, it is thought that the beam pattern of the transmitting antenna ATX that the wireless communication device 1 used to transmit an Ack frame was appropriate during the transmission of the Ack frame.

Accordingly, when the wireless communication device 1 transmits a MAC frame (for example, a data frame) after transmitting an Ack frame, it may also use the beam pattern of the transmitting antenna ATX which was used for transmitting the Ack frame (see FIG. 8A and FIG. 8B). Although the time from the transmission of an Ack frame to the transmission of a MAC frame (for example, a data frame) also depends on the communication environment, it is estimated to be roughly about tens of microseconds to tens of milliseconds, which is a sufficiently short period, compared with the setting period PH1 (for example, tens of milliseconds to hundreds of milliseconds) shown in FIG. 18A.

FIG. 8A is a flowchart illustrating one example of an operation procedure for the data-receiving wireless communication device Dv2 in the first embodiment to transmit a data frame by using the beam pattern of the transmitting antenna ATX for transmitting an Ack frame. FIG. 8B is a sequence diagram showing one example of signaling for the data-receiving wireless communication device Dv2 shown in FIG. 8A to transmit a data frame by using the beam pattern of the transmitting antenna ATX for transmitting an Ack frame. In FIG. 8A, descriptions for operations that are the same as the operations shown in FIG. 4B are omitted or briefly given with the same numerals given thereto, and different details will be described.

In FIG. 8A, after step P6, the wireless transmitting unit 14 uses the beam pattern of the transmitting antenna ATX, the beam pattern being held in step P5, to transmit a MAC frame (for example, a data frame) to the communication partner (P11).

In FIG. 8B, after step S4, the data-receiving wireless communication device Dv2 uses the beam pattern of the transmitting antenna ATX, the beam pattern being used in step S4, to transmit a MAC frame (for example, a data frame) to the data-transmitting wireless communication device Dv1 (S10).

Since this allows the wireless communication device 1 (the data-receiving wireless communication device Dv2) to substantially set, during response with an Ack frame indicating reception of a MAC frame transmitted from the communication partner, the beam pattern of the transmitting antenna ATX for transmitting a data frame, it is possible to omit the setting period PH1 for the data-receiving wireless communication device Dv2 to transmit a MAC frame. Also, since the procedure and the time involved in setting the setting period PH1 can be omitted, the effective throughput can be improved.

Modification 1 of First Embodiment

In the first embodiment, in the data-receiving wireless communication device Dv2, for example, no distinction is made as to whether the cause for why the retry bit of a MAC frame has changed from 1 to 0 or the sequence number has changed is that the data-transmitting wireless communication device Dv1 has properly received an Ack frame or the number of retransmissions of a MAC frame retransmitted by the data-transmitting wireless communication device Dv1 has reached the predetermined upper limit of the number of retransmissions.

In a first modification (hereinafter referred to as "present first modification") in the first embodiment, upon determining that the cause corresponds to one of the following four cases, the data-receiving wireless communication device Dv2 determines that, for example, the cause for why the retry bit of the MAC frame has changed from 1 to 0 or the sequence number has changed is that the number of retransmissions of a MAC frame has reached the predetermined upper limit number of times. That is, the data-receiving wireless communication device Dv2 changes the beam pattern of the transmitting antenna ATX which is to be used for transmitting an Ack frame, without holding the beam pattern (see FIG. 9).

In a first case, the data-receiving wireless communication device Dv2 counts the number of receptions of the retransmitted same MAC frame, until receiving, from the data-transmitting wireless communication device Dv1, a notification indicating that the number of retransmissions has reached the predetermined upper limit number of times. When the counted number of receptions and the upper limit number of times of the retransmission match each other, and further, for example, the retry bit in the MAC frame changes from 1 to 0 or the sequence number changes, the data-receiving wireless communication device Dv2 determines that the cause is that the number of retransmissions of the MAC frame has reached the predetermined upper limit number of times.

In a second case, the data-receiving wireless communication device Dv2 acquires information of the number of retransmissions, the information being included in a MAC frame transmitted from the data-transmitting wireless communication device Dv1, until receiving, from the data-transmitting wireless communication device Dv1, a notification indicating that the number of retransmissions has reached the predetermined upper limit number of times. When the acquired number of retransmissions and the upper limit number of times of the retransmission match each other, and further, for example, the retry bit in the MAC frame changes from 1 to 0 or the sequence number changes, the data-receiving wireless communication device Dv2 determines that the cause is that the number of retransmissions of the MAC frame has reached the predetermined upper limit number of times.

In a third case, the data-receiving wireless communication device Dv2 acquires information of the number of remaining retransmittable times, the information being included in a MAC frame transmitted from the data-transmitting wireless communication device Dv1. When the acquired number of remaining retransmittable times reaches 0, and further, for example, the retry bit in the MAC frame changes from 1 to 0 or the sequence number changes, the data-receiving wireless communication device Dv2 determines that the cause is that the number of retransmissions of the MAC frame has reached the predetermined upper limit number of times.

In a fourth case, when the data-receiving wireless communication device Dv2 detects a flag indicating a last retransmission from a MAC frame transmitted from the data-transmitting wireless communication device Dv1, and further, for example, when the retry bit in the MAC frame changes from 1 to 0 or the sequence number changes, the data-receiving wireless communication device Dv2 determines that the cause is that the number of retransmissions of the MAC frame has reached the predetermined upper limit number of times.

Figure 9:
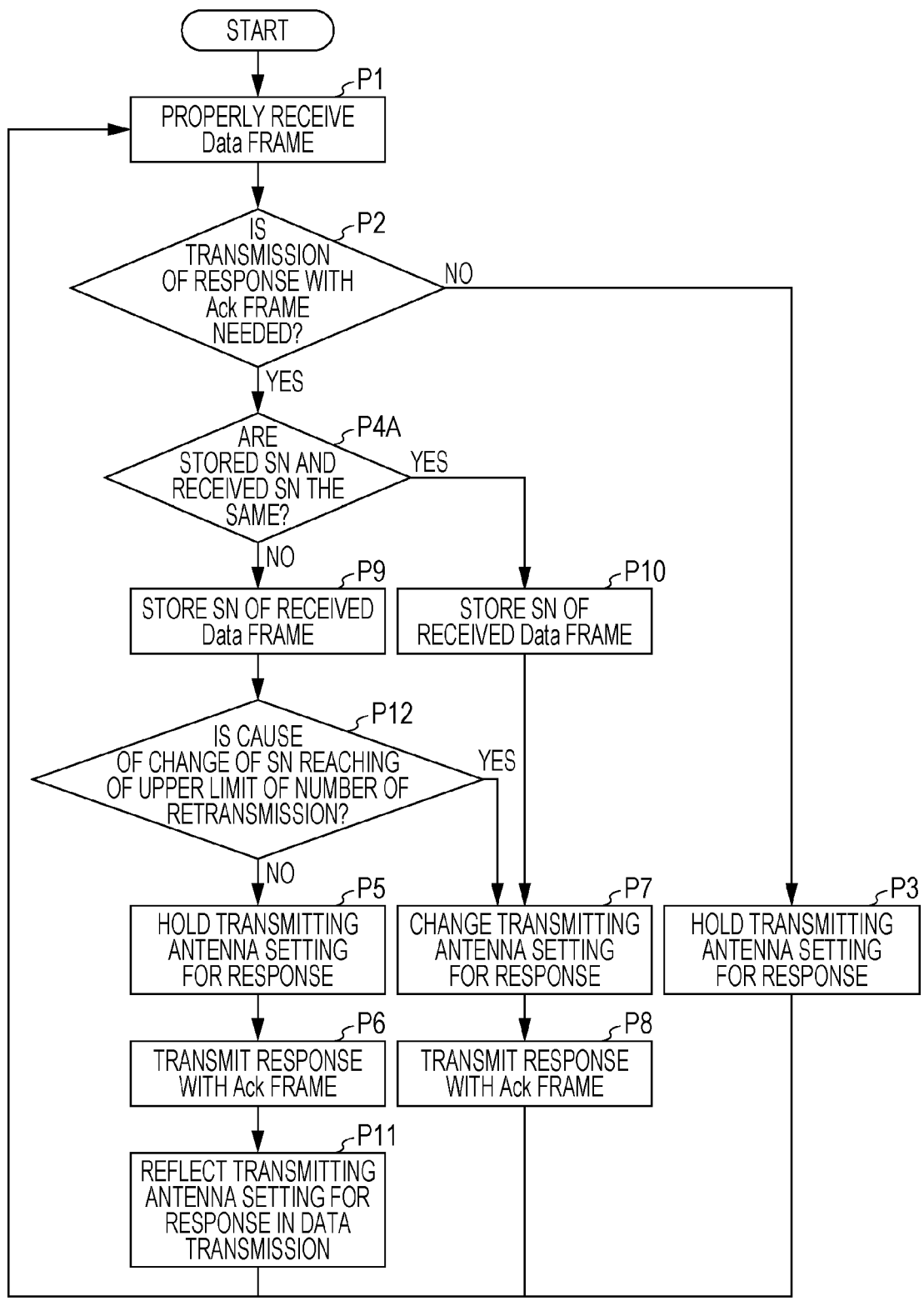
FIG. 9 is a flowchart illustrating one example of a procedure for setting the beam pattern of the transmitting antenna for transmitting an Ack frame in response to a data frame received by the data-receiving wireless communication device in a first modification of the first embodiment.

FIG. 9 is a flowchart illustrating one example of a procedure for setting the beam pattern of the transmitting antenna ATX for an Ack frame in response to a data frame received by the data-receiving wireless communication device Dv2 in the first modification of the first embodiment. In FIG. 9, descriptions for operations that are the same as the operations shown in FIG. 8A are omitted or briefly given with the same numerals given thereto, and different details will be described.

In FIG. 9, on the basis of the first to fourth cases described above, the SN determining unit 15B determines that the cause for why the sequence number of the MAC frame (for example, a data frame) received in step P1 has changed is that the number of retransmissions of the MAC frame has reached the predetermined upper limit number of times (P12).

When the SN determining unit 15B determines that the cause for why the sequence number of the MAC frame (for example, a data frame) has changed corresponds to one of the first case to the fourth case described above, the transmitting-antenna control unit 16T determines whether or not the number of retransmissions of the MAC frame has reached the predetermined upper limit number of times. Upon determining that the number of retransmissions of the MAC frame has reached the upper limit number of times (P12, YES), the transmitting-antenna control unit 16T changes the beam pattern of the transmitting antenna ATX which is to be used for a response with an Ack frame (P7).

By using the beam pattern of the transmitting antenna ATX after the change in step P7, the wireless transmitting unit 14 transmits an Ack frame generated by the response-frame generating unit 13 to the communication partner (P8).

On the other hand, when the SN determining unit 15B determines that the cause for why the sequence number of the MAC frame (for example, a data frame) has changed is not that the number of retransmissions of the MAC frame has reached the predetermined upper limit number of times of the retransmission (P12, NO), the transmitting-antenna control unit 16T holds the beam pattern of the transmitting antenna ATX which is to be used for a response with an Ack frame (P5).

The wireless transmitting unit 14 uses the beam pattern of the transmitting antenna ATX, the beam pattern being held in step P5, to transmit an Ack frame generated by the response-frame generating unit 13 to the communication partner (the data-transmitting wireless communication device Dv1) (P6), and the data-receiving wireless communication device Dv2 uses the beam pattern of the transmitting antenna ATX, the beam pattern being held in step P5, to transmit a MAC frame (for example, a data frame) to the communication partner (the data-transmitting wireless communication device Dv1) (P11).

As described above, since the wireless communication device 1 in the present first modification is configured so that the data-receiving wireless communication device Dv2 determines the cause of change of the sequence number, it is possible to reduce the number of transmissions of an Ack frame and it is possible to set the beam pattern of the transmitting antenna ATX which is appropriate for transmitting an Ack frame to the communication partner.

Second Modification of First Embodiment

In the first embodiment, when the retry bit in a MAC frame (for example, a data frame) received from the communication partner (the data-transmitting wireless communication device Dv1) to the wireless communication device 1 (the data-receiving wireless communication device Dv2) is 0 or the sequence number thereof changes, it is thought that the beam pattern of the transmitting antenna ATX that the wireless communication device 1 (the data-receiving wireless communication device Dv2) used to transmit an Ack frame was appropriate at the time of transmission of the Ack frame.

In a second modification (hereinafter referred to as "present second modification") of the first embodiment, the data-receiving wireless communication device Dv2 uses, as the beam pattern of the receiving antenna ARX, the same beam pattern as the beam pattern of the transmitting antenna ATX used during transmission of an Ack frame (see FIG. 10).

For example, during reception of a MAC frame, the data-transmitting wireless communication device Dv1 and the data-receiving wireless communication device Dv2 set the beam pattern of the receiving antenna ARX to the omnidirectional (omni) or quasi-omnidirectional (quasi-omni) beam pattern in many cases.

For example, in a TXOP (Transmission Opportunity) period in CSMA/CA, the data-transmitting wireless communication device Dv1 and the data-receiving wireless communication device Dv2 do not need to receive a MAC frame transmitted from a third station and thus do not have to set the beam pattern of the receiving antenna ARX to the omnidirectional (omni) or quasi-omnidirectional (quasi-omni) beam pattern.

Also, in an SP (Service Period) period in SPCA communication, the data-transmitting wireless communication device Dv1 and the data-receiving wireless communication device Dv2 can identify the transmission source of a MAC frame that is received and thus do not have to set the beam pattern of the receiving antenna ARX to the omnidirectional (omni) or quasi-omnidirectional (quasi-omni) beam pattern.

Figure 10:
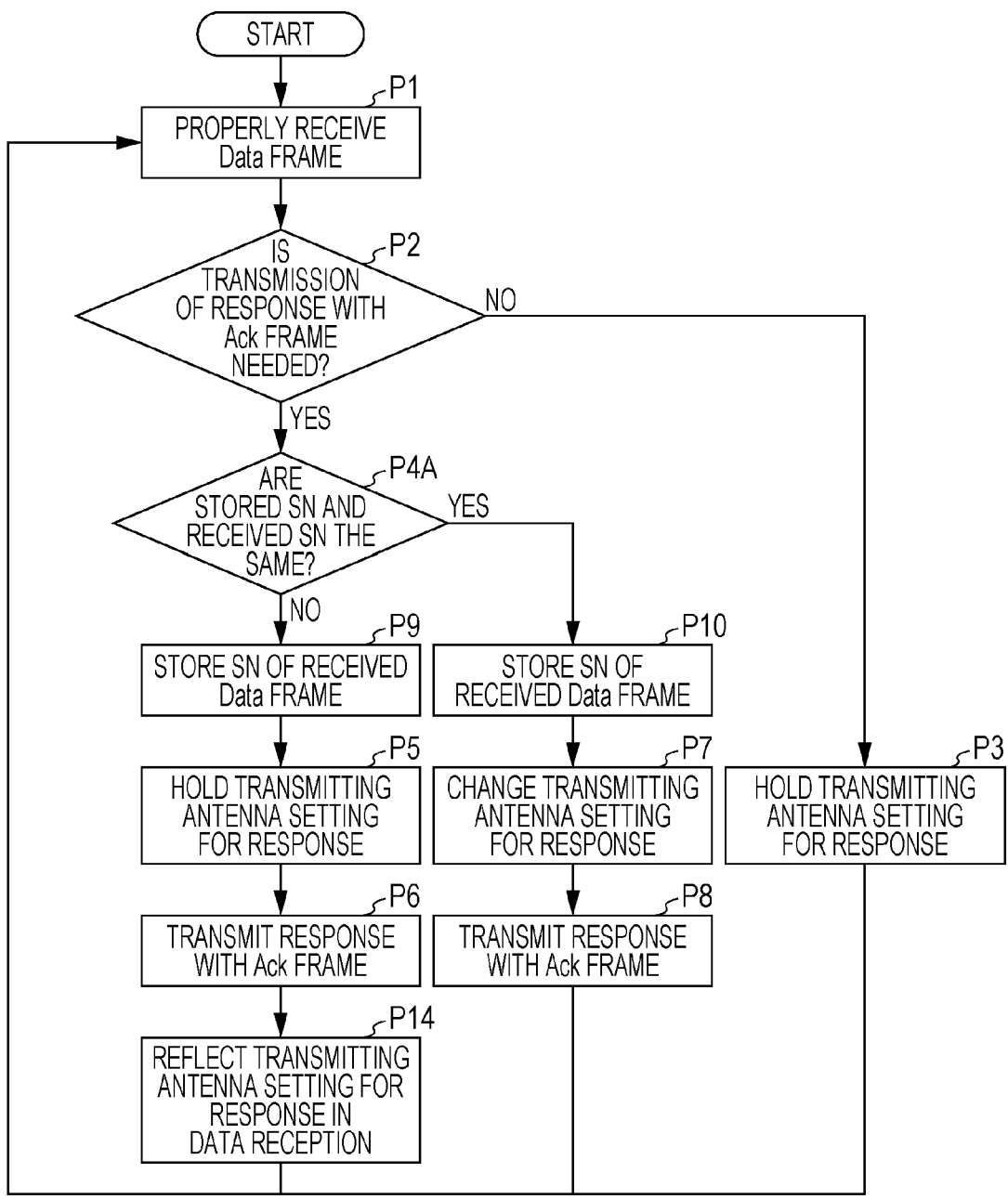
FIG. 10 is a flowchart illustrating one example of a procedure for setting the beam pattern of the transmitting antenna for transmitting an Ack frame in response to a data frame received by the data-receiving wireless communication device in a second modification of the first embodiment and the beam pattern of the receiving antenna for receiving a data frame next time.

FIG. 10 is a flowchart illustrating one example of a procedure for setting the beam pattern of the transmitting antenna for transmitting an Ack frame in response to a data frame received by the data-receiving wireless communication device Dv2 in the second modification of the first embodiment and the beam pattern of the receiving antenna for receiving a data frame next time. In FIG. 10, descriptions for operations that are the same as the operations shown in FIG. 8A are omitted or briefly given with the same numerals given thereto, and different details will be described.

In FIG. 10, after step P6, the receiving-antenna control unit 16R in the data-receiving wireless communication device Dv2 uses the same beam pattern as the beam pattern of the transmitting antenna ATX as the beam pattern of the receiving antenna ARX in order to receive a MAC frame transmitted from the communication partner (the data-transmitting wireless communication device Dv1) (P14).

As a result, it is sufficient when the wireless communication device 1 (the data-receiving wireless communication device Dv2) in the present second modification forms a main beam in a specific direction without setting the beam pattern of the receiving antenna ARX to the omnidirectivity (omni) or quasi-omnidirectivity (quasi-omni), thus making it possible to effectively use the communication band and to reduce the power consumption.

In addition, in the setting period PH1 in the next transmission cycle TR after holding or changing the beam pattern of the transmitting antenna ATX which is to be used to transmit an Ack frame, the wireless communication device 1 (the data-receiving wireless communication device Dv2) in the present second modification can, for example, omit the setting of the beam pattern of the receiving antenna ARX and can set the same beam pattern as the beam pattern of the transmitting antenna ATX.

Thus, in the setting period PH1 in the next transmission cycle TR, the wireless communication device 1 in the present second modification can suppress using a communication channel (a communication band) needed to set the beam pattern of the receiving antenna ARX, thus making it possible to effectively use the communication band and to reduce the power consumption.

SECOND EMBODIMENT

In the second embodiment, a description will be given of a case in which, for example, the data-transmitting wireless communication device Dv1 transmits the aggregation frame shown in FIG. 16A and the data-receiving wireless communication device Dv2 makes a response with a block Ack frame indicating that some or all MAC frames (MPDU) of the aggregation frame are received. The data-transmitting wireless communication device Dv1 and the data-receiving wireless communication device Dv2 in the present embodiment have configurations that are similar to that of the wireless communication device 1A shown in FIG. 3A or the wireless communication device 1B shown in FIG. 3B.

Figure 11:
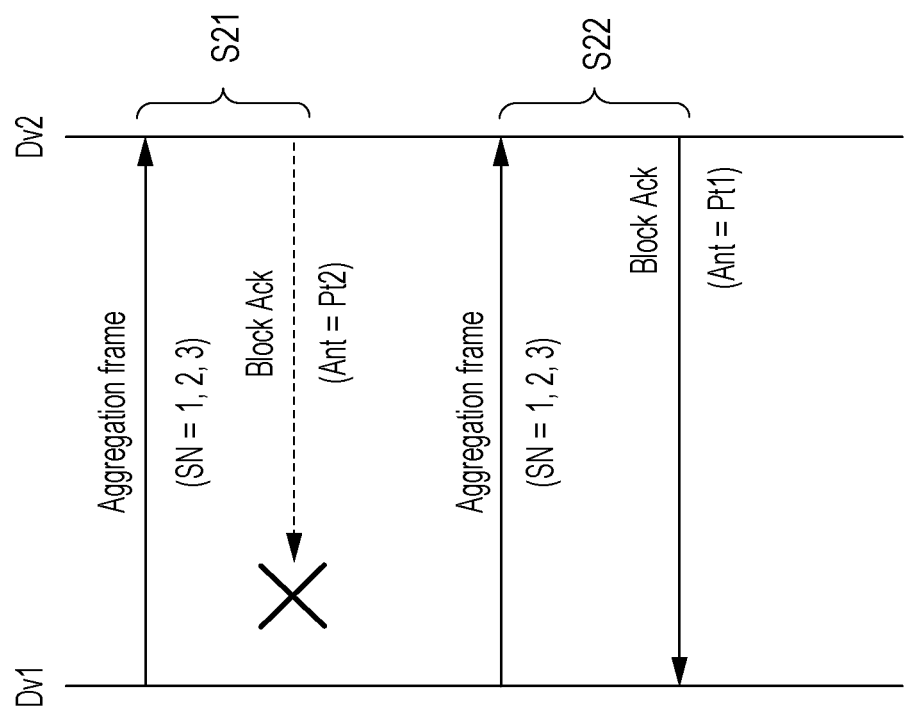
FIG. 11 is a sequence diagram showing one example of signaling regarding transmission of an aggregation data frame, the signaling being performed by a data-transmitting wireless communication device and a data-receiving wireless communication device in a second embodiment.

First, an overview of an operation of direct wireless communication between the data-transmitting wireless communication device Dv1 and the data-receiving wireless communication device Dv2 in the present embodiment will be described with reference to FIG. 11. FIG. 11 is a sequence diagram showing one example of signaling regarding transmission of an aggregation data frame, the signaling being performed by the data-transmitting wireless communication device Dv1 and the data-receiving wireless communication device Dv2 in the second embodiment.

In FIG. 11A, the data-transmitting wireless communication device Dv1 transmits an aggregation frame including a plurality of MAC frames (MPDU) to the data-receiving wireless communication device Dv2 (S21). The aggregation frame has a structure in which, for example, a MAC frame "sequence number=1", a MAC frame "sequence number=2", and a MAC frame "sequence number=3" are coupled.

When the data-receiving wireless communication device Dv2 properly receives the aggregation frame transmitted from the data-transmitting wireless communication device Dv1 and further determines that a response with a block Ack frame is needed, the data-receiving wireless communication device Dv2 uses the beam pattern (for example, Pt2) of the transmitting antenna ATX to transmit a block Ack frame to the data-transmitting wireless communication device Dv1 (S21). However, in FIG. 11, the block Ack frame does not arrive at the data-transmitting wireless communication device Dv1 (S21).

Since the data-transmitting wireless communication device Dv1 does not receive a block Ack frame corresponding to the aggregation frame transmitted in step S21, the data-transmitting wireless communication device Dv1 retransmits the same aggregation frame as the aggregation frame transmitted in step S21 (S22).

Since the data-receiving wireless communication device Dv2 properly receives the aggregation frame retransmitted from the data-transmitting wireless communication device Dv1, the aggregation frame having the same sequence numbers, and further determines that a response with a block Ack frame is needed, the data-receiving wireless communication device Dv2 changes the beam pattern (for example, Pt2) of the transmitting antenna ATX (S22). That is, upon determining that an initial transmission or retransmission of an aggregation frame including MAC frames (MPDU) that all have the same sequence numbers has been previously performed, the data-receiving wireless communication device Dv2 assumes that the beam pattern of the transmitting antenna ATX is not appropriate and changes the beam pattern of the transmitting antenna ATX which is to be used for a response with a block Ack frame.

Accordingly, the data-receiving wireless communication device Dv2 uses the beam pattern (for example, Pt1) of the transmitting antenna ATX after the change to transmit a block Ack frame to the data-transmitting wireless communication device Dv1 (S22). In FIG. 11, the block Ack frame transmitted in step S22 is properly received by the data-transmitting wireless communication device Dv1, since the communication environment between the data-transmitting wireless communication device Dv1 and the data-receiving wireless communication device Dv2 and the beam patterns of the antennas are appropriate.

Upon determining that an initial transmission or retransmission of an aggregation frame including MAC frames (MPDU) that all have the same sequence numbers has not been performed, that is, some MAC frames (MPDU) of the aggregation frame are newly transmitted, the data-receiving wireless communication device Dv2 holds the beam pattern of the transmitting antenna ATX which is to be used for a response with a block Ack frame, without changing the beam pattern.

Figure 12:
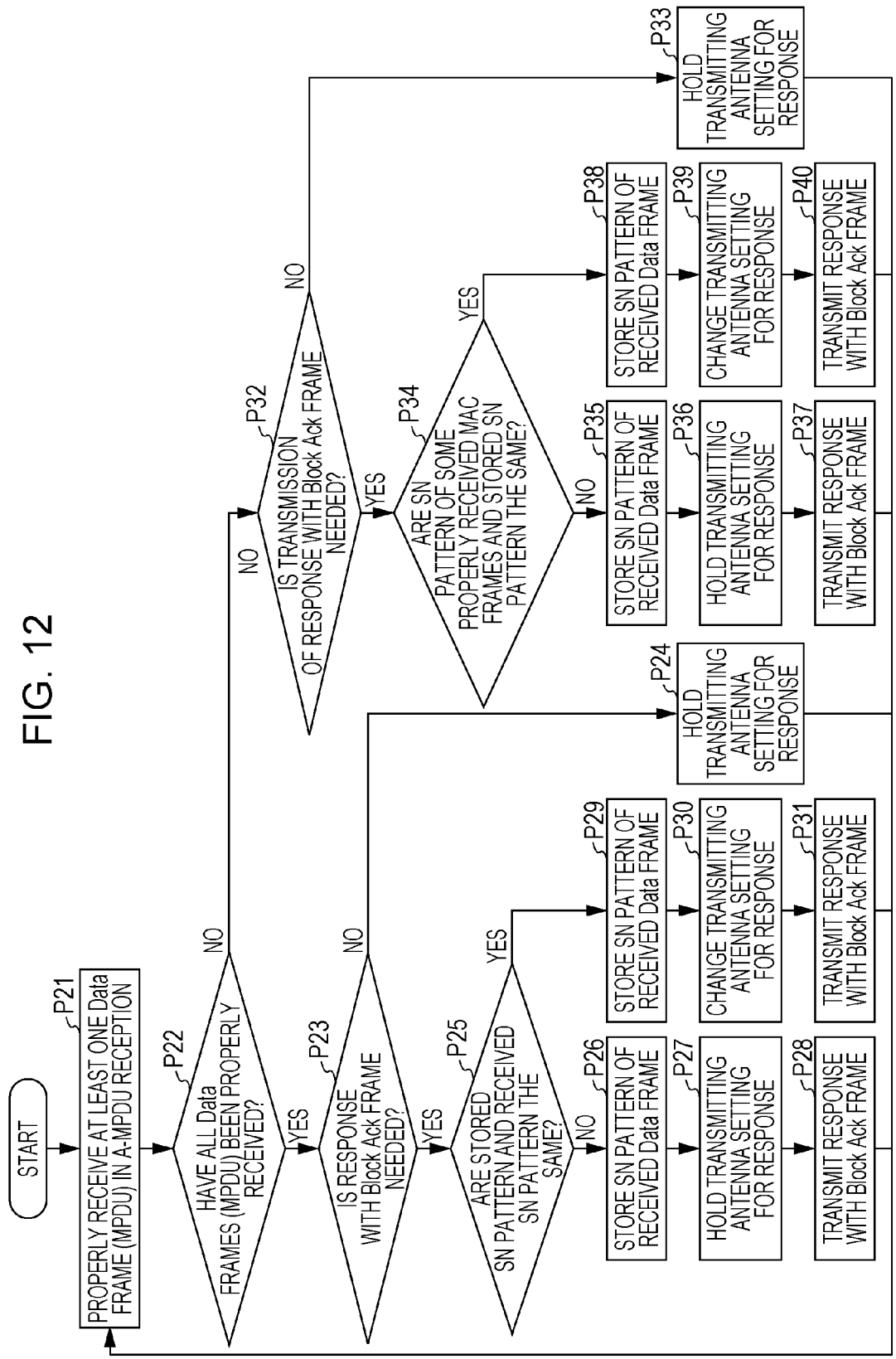
FIG. 12 is a flowchart illustrating one example of a procedure for setting the beam pattern of a transmitting antenna for transmitting a block Ack frame corresponding to an aggregation data frame received by the data-receiving wireless communication device in the second embodiment.

Next, an operation procedure from when the wireless communication device 1 in the present embodiment receives an aggregation frame until it transmits a block Ack frame will be described with reference to FIG. 12. FIG. 12 is a flowchart illustrating one example of a procedure for setting the beam pattern of the transmitting antenna for transmitting a block Ack frame corresponding to an aggregation data frame received by the data-receiving wireless communication device Dv2 in the second embodiment.

In FIG. 12, a description will be given assuming that the wireless communication device 1B shown in FIG. 3B has properly received at least one MAC frame (MPDU) of an aggregation frame (P21).

In FIG. 12, the wireless receiving unit 11 determines whether or not all MAC frames (MPDU) of the properly received aggregation frame have been properly received (P22). When it is determined that all MAC frames (MPDU) have been properly received (P22, YES), the response-needed/not-needed determining unit 12 determines whether or not a response with a block Ack frame indicating the reception of the aggregation frame is needed, on the basis of the frame type or response type of each MPDU of the aggregation frame demodulated by the wireless receiving unit 11 (P23). The response-needed/not-needed determining unit 12 outputs a result of the determination to the response-frame generating unit 13, the SN determining unit 15B, and the transmitting-antenna control unit 16T.

When the response-needed/not-needed determining unit 12 determines that a response with a block Ack frame is not needed (P23, NO), the transmitting-antenna control unit 16T holds the beam pattern of the transmitting antenna ATX (P24).

When the response-needed/not-needed determining unit 12 determines that a response with a block Ack frame is needed (P23, YES), the response-frame generating unit 13 generates a block Ack frame indicating reception of an aggregation frame and outputs the block Ack frame to the wireless transmitting unit 14.

When the response-needed/not-needed determining unit 12 determines that a response with a block Ack frame is needed (P23, YES), the SN determining unit 15B determines whether or not a stored SN pattern and a received SN pattern are the same (P25). The SN determining unit 15B stores the received SN pattern, regardless of a result of the determination in step P25 (P26, P29).

For ease of description of the present embodiment, a set (pattern) of the sequence numbers of properly received MAC frames (MPDU) of a previously received aggregation frame, the sequence numbers being stored by the SN determining unit 15B, is simply referred to as a "stored SN pattern", and a set (pattern) of the sequence numbers of properly received MAC frames (MPDU) of an aggregation frame received by the receiving antenna ARX this time is simply referred to as a "received SN pattern".

Since the SN determining unit 15B determines that the stored SN pattern and the received SN pattern do not match each other, after step P26, the transmitting-antenna control unit 16T holds the beam pattern of the transmitting antenna ATX which is to be used for a response with a block Ack frame (P27).

When the stored SN pattern and the received SN pattern do not match each other, this means that the wireless communication device 1B received an aggregation frame including a MAC frame (MPDU) given a new sequence number. Accordingly, it is thought that the beam pattern of the transmitting antenna ATX which was used for the previous response with a block Ack frame is appropriate and it is not necessary to change the beam pattern of the transmitting antenna ATX.

The wireless transmitting unit 14 uses the beam pattern of the transmitting antenna ATX, the beam pattern being held in step P27, to transmit a block Ack frame generated by the response-frame generating unit 13 to the communication partner (the data-transmitting wireless communication device Dv1) (P28).

On the other hand, since the SN determining unit 15B determines that the stored SN pattern and the received SN pattern match each other, after step P29, the transmitting-antenna control unit 16T changes the beam pattern of the transmitting antenna ATX which is to be used for a response with a block Ack frame (P30).

When the stored SN pattern and the received SN pattern match each other, this means that an aggregation frame including a MAC frame (MPDU) given the same sequence number was retransmitted and the wireless communication device 1B received the retransmitted aggregation frame. Accordingly, it is thought that the beam pattern of the transmitting antenna ATX which was used for the previous response with a block Ack frame is inappropriate and it is necessary to change the beam pattern of the transmitting antenna ATX.

The wireless transmitting unit 14 uses the beam pattern of the transmitting antenna ATX after the change in step P30 to transmit a block Ack frame generated by the response-frame generating unit 13 to the communication partner (the data-transmitting wireless communication device Dv1) (P31).

Also, when the wireless receiving unit 11 determines that all MAC frames (MPDU) have not been properly received (P22, NO), the response-needed/not-needed determining unit 12 determines whether or not a response with an block Ack frame indicating the reception of an aggregation frame is needed, on the basis of the frame type or response type of the aggregation frame demodulated by the wireless receiving unit 11, that is, some properly received MAC frames (MPDU) thereof (P32). The response-needed/not-needed determining unit 12 outputs a result of the determination to the response-frame generating unit 13, the SN determining unit 15B, and the transmitting-antenna control unit 16T.

When the response-needed/not-needed determining unit 12 determines that a response with a block Ack frame is not needed (P32, NO), the transmitting-antenna control unit 16T holds the beam pattern of the transmitting antenna ATX (P33).

When the response-needed/not-needed determining unit 12 determines that a response with a block Ack frame is needed (P32, YES), the response-frame generating unit 13 generates a block Ack frame indicating the reception of the aggregation frame and outputs the Ack frame to the wireless transmitting unit 14.

When the response-needed/not-needed determining unit 12 determines that a response with a block Ack frame is needed (P32, YES), the SN determining unit 15B determines that a stored SN pattern and a received SN pattern of some properly received MAC frames (MPDU) of the aggregation frame are the same (P34). The SN determining unit 15B stores the received SN pattern, regardless of a result of the determination in step P34 (P35, P38).

Since the SN determining unit 15B determines that the stored SN pattern and the received SN pattern of some properly received MAC frames (MPDU) of the aggregation frame do not match each other, after step P35, the transmitting-antenna control unit 16T holds the beam pattern of the transmitting antenna ATX which is to be used for a response with a block Ack frame (P36).

Since the stored SN pattern and the received SN pattern of some properly received MAC frames (MPDU) of the aggregation frame do not match each other, this means that the wireless communication device 1B received an aggregation frame including a MAC frame (MPDU) given a new sequence number. Accordingly, it is thought that the beam pattern of the transmitting antenna ATX which was used for the previous response with a block Ack frame is appropriate and it is not necessary to change the beam pattern of the transmitting antenna ATX.

The wireless transmitting unit 14 uses the beam pattern of the transmitting antenna ATX, the beam pattern being held in step P36, to transmit a block Ack frame generated by the response-frame generating unit 13 to the communication partner (P37).

On the other hand, since the SN determining unit 15B determines that the stored SN pattern and the received SN pattern of some properly received MAC frames (MPDU) of the aggregation frame match each other, after step P38, the transmitting-antenna control unit 16T changes the beam pattern of the transmitting antenna ATX which is to be used for a response with a block Ack frame (P39).

Since the stored SN pattern and the received SN pattern of some properly received MAC frames (MPDU) of the aggregation frame match each other, this means that an aggregation including a MAC frame (MPDU) given the same sequence number was retransmitted and the wireless communication device 1B received the retransmitted aggregation frame. Accordingly, it is thought that the beam pattern of the transmitting antenna ATX which was used for the previous response with a block Ack frame is inappropriate and it is necessary to change the beam pattern of the transmitting antenna ATX.

The wireless transmitting unit 14 uses the beam pattern of the transmitting antenna ATX after the change in step P39 to transmit a block Ack frame generated by the response-frame generating unit 13 to the communication partner (P40).

The operation of the wireless communication device 1A after step P28, step P31, step P37, or step P40 returns to step P21.

As described above, when the wireless communication device 1 in the present embodiment properly receives some or all MAC frames (MPDU) of an aggregation frame transmitted from the communication partner and determines that a response with a block Ack frame indicating a response to the aggregation frame is needed, the wireless communication device 1 compares a stored SN pattern with the received SN pattern to determine whether or not the same aggregation frame was retransmitted from the communication partner.

Upon determining that the same aggregation frame was retransmitted from the communication partner, the wireless communication device 1 assumes that the beam pattern of the transmitting antenna ATX used to transmit the previously transmitted block Ack frame was not appropriate and changes the beam pattern of the transmitting antenna ATX. The wireless communication device 1 uses the changed beam pattern to transmit a block Ack frame.

Thus, when the same aggregation frame is not retransmitted from the communication partner, the wireless communication device 1 does not change the beam pattern of the transmitting antenna ATX which is to be used for transmitting a block Ack frame, and changes the beam pattern of the transmitting antenna ATX when the same aggregation frame is retransmitted, thus making it possible to avoid an unnecessary change of the beam pattern of the transmitting antenna ATX.

Accordingly, by avoiding an unnecessary change of the beam pattern of the transmitting antenna ATX, the wireless communication device 1 can omit the setting period PH1 and a preparation period for setting the setting period PH1, thus making it possible to quickly restore the communication channel and making it possible to suppress deterioration of the environment of communication (the quality of communication) with the communication partner. That is, the wireless communication device 1 can reduce an unnecessary occupancy time (for example, the setting period PH1 and a preparation period for setting the setting period PH1) in a communication band, thus making it possible to improve the effective throughput and further making it possible to reduce the power consumption and the time taken for connection to the communication partner.

In the present embodiment, all of the MAC frames (MPDU) of an aggregation frame are not necessarily always received, and, for example, when three MAC frames are coupled, a total of eight combinations of receptions are possible. Thus, in step P21 shown in FIG. 12, upon receiving MAC frames that are included in an aggregation frame and that are more than or equal to a predetermined threshold, the wireless communication device 1B may determine that an aggregation frame including some MAC frames is received.

Accordingly, when the wireless communication device 1B receives MAC frames that are included in an aggregation frame and that are fewer than the predetermined threshold and does not receive other frames, the wireless communication device 1B determines that no aggregation frame has been received, presuming that comparison of a stored SN pattern with the received SN pattern becomes difficult. Thus, after properly receiving an aggregation frame, the wireless communication device 1B can compare the stored SN pattern with the received SN pattern with high accuracy, can avoid erroneous determination of retransmission of an aggregation frame, and can set the beam pattern of the antenna with high accuracy.

Although various embodiments have been described above with reference to the drawings, it goes without saying that the present disclosure is not limited to such examples. It is apparent to those skilled in the art that various variations or modifications can be conceived within the scope recited in the claims, and it is to be understood that such variations and modifications also naturally belong to the technical scope of the present disclosure.

In each embodiment described above, although the wireless communication device 1 transmits an Ack frame or block Ack frame by using the same frequency as the frequency that the communication partner used to transmit a MAC frame (for example, a data frame), the wireless communication device 1 may also transmit an Ack frame or block Ack frame by using a frequency that is different from the frequency that the communication partner used to transmit a MAC frame (for example, a data frame).

In each embodiment described above, although the communication partner of the wireless communication device 1 transmits a data frame by using a directional band (for example, millimeter waves), the communication partner may transmit a data frame by using an un-directional band (for example, microwaves).

Third Modification of First Embodiment

In the first or second embodiment, the situation of the communication channel between the data-transmitting wireless communication device Dv1 and the data-receiving wireless communication device Dv2 can be accurately determined using the retry bits, the sequence numbers, and the sequence number pattern in an aggregation frame or MAC frames properly received by the data-receiving wireless communication device Dv2. For example, in a communication environment where the beam pattern of the transmitting antenna ATX or the receiving antenna ARX is held, it is thought that the quality of communication between the data-transmitting wireless communication device Dv1 and the data-receiving wireless communication device Dv2 is high.

In a third modification of the first embodiment, the wireless communication device 1 may reduce, for example, the transmit power (see FIG. 13), may reduce the gain of the receiving antenna ARX, may increase the MCS (Modulation and Coding Scheme: the degree of modulation) or the coding rate, may increase the frame length of MAC frames, or may increase the number of coupled MAC frames in an aggregation frame. This allows the wireless communication device 1 to effectively use the wireless band and makes it possible to reduce the power consumption of the wireless communication device 1.

Also, for example, in a communication environment where the beam pattern of the transmitting antenna ATX or the receiving antenna ARX is changed, it is thought that the quality of communication between the data-transmitting wireless communication device Dv1 and the data-receiving wireless communication device Dv2 deteriorates.

In the third modification of the first embodiment, the wireless communication device 1 may increase, for example, the transmit power (see FIG. 13), may increase the gain of the receiving antenna ARX, may reduce the MCS (Modulation and Coding Scheme: the degree of modulation), may reduce the frame length of MAC frames, may reduce the number of coupled MAC frames in an aggregation frame, or may change a carrier frequency used to another carrier frequency.

For example, in accordance with deterioration of the quality of communication, the wireless communication device 1 scans frequency bands to thereby estimate a frequency band in which the quality of communication is high. This allows the wireless communication device 1 to avoid unnecessary retransmission of an aggregation frame or a MAC frame, thus making it possible to effectively use the wireless band and making it possible to reduce the power consumption of the wireless communication device 1.

Figure 13:
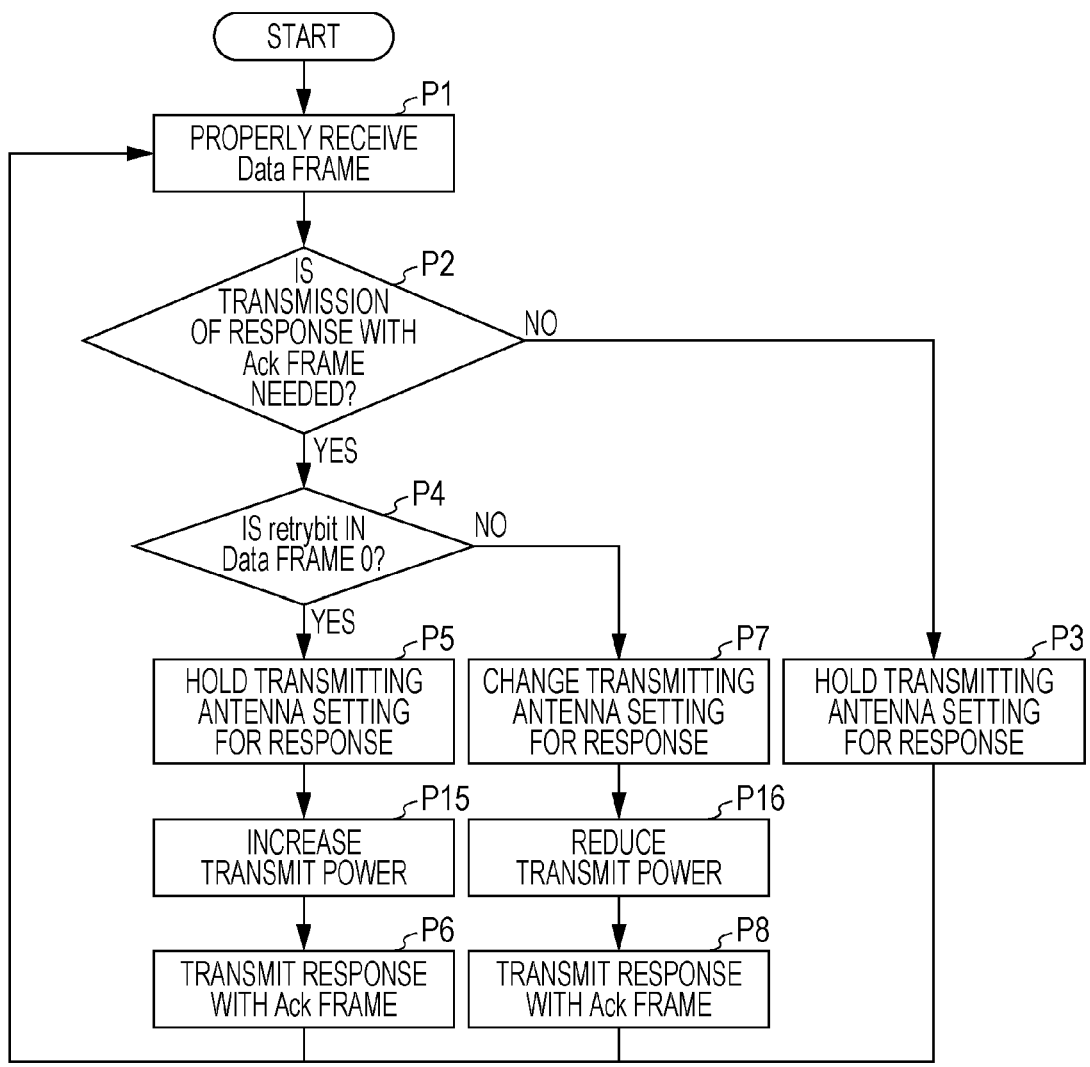
FIG. 13 is a flowchart illustrating one example of a procedure for setting the beam pattern of the transmitting antenna for transmitting an Ack frame corresponding to a MAC frame received by the data-receiving wireless communication device in a third modification of the first embodiment.

FIG. 13 is a flowchart illustrating one example of a procedure for setting the beam pattern of the transmitting antenna ATX for transmitting an Ack frame corresponding to a MAC frame received by the data-receiving wireless communication device Dv2 in the third modification of the first embodiment. In FIG. 13, descriptions for operations that are the same as the operations shown in FIG. 4A are omitted or briefly given with the same numerals given thereto, and different details will be described.

In FIG. 13, after step P5, the wireless transmitting unit 14 reduces the transmit power for an Ack frame generated by the response-frame generating unit 13 (P15) and uses the beam pattern of the transmitting antenna ATX, the beam pattern being held in step P5, to transmit the Ack frame to the communication partner (P6).

Also, after step P7, the wireless transmitting unit 14 increases the transmit power for an Ack frame generated by the response-frame generating unit 13 (P16) and uses the beam pattern of the transmitting antenna ATX after the change in step P7 to transmit the Ack frame to the communication partner (P8).

Fourth Modification of First Embodiment

Although the transmission of a MAC frame, the transmission of a response with an Ack frame, the transmission of an aggregation frame, and the transmission of a response with a block Ack frame have been described by way of example in each embodiment described above, the combination of the transmission and the response transmission may also be, for example, any of a combination of the transmission of RTS (Request To Send) and CTS (Clear To Send), a combination of SSW (Sector Sweep), SSW-FB (Sector Sweep-Feedback), and SSW-Ack (Sector Sweep-Ack), a combination of Association Request and Ack, and a combination of Association Response and Ack.

Figure 19A:
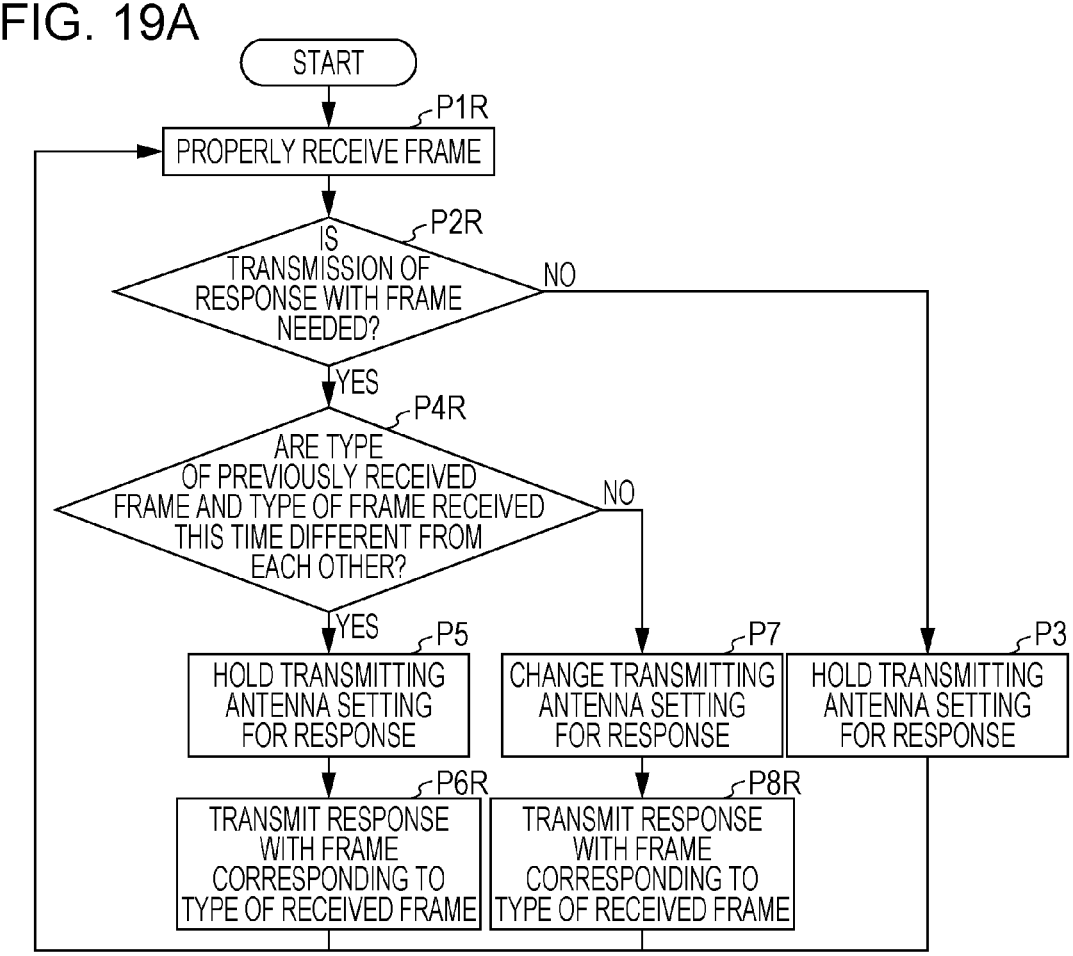
FIG. 19A is a flowchart illustrating one example of a procedure for setting the beam pattern of a transmitting antenna for a CTS frame in response to a MAC frame (for example, an RTS frame) received by a data-receiving wireless communication device in a fourth modification of the first embodiment.
Figure 19B:
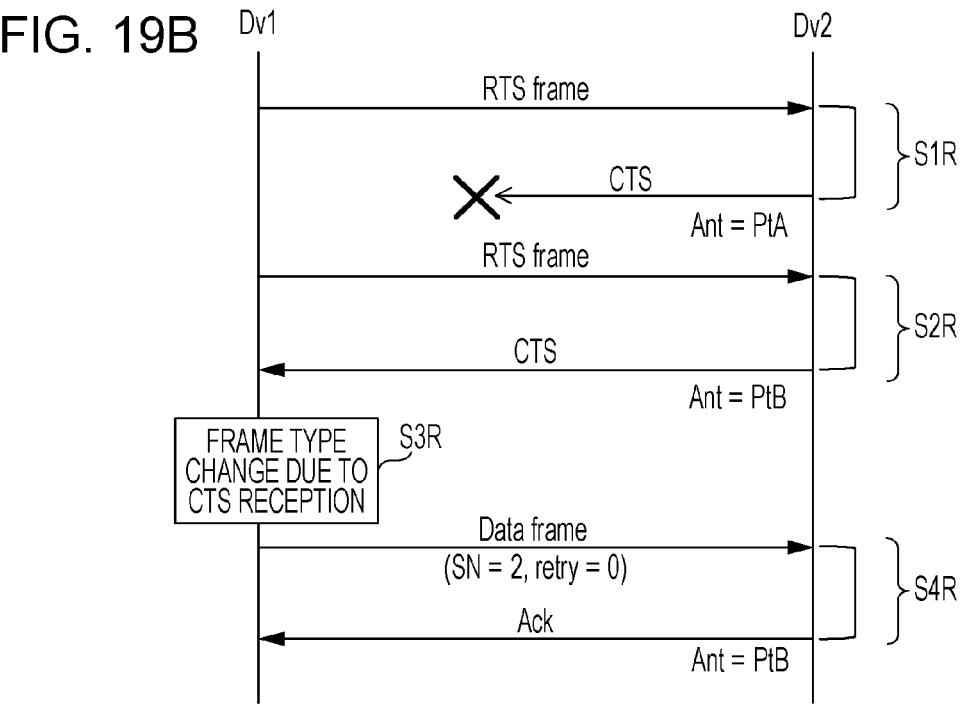
FIG. 19B is a sequence diagram showing one example of signaling in which a frame type is changed upon reception of a CTS frame, the signaling being performed by a data-transmitting wireless communication device and the data-receiving wireless communication device in the fourth modification of the first embodiment.

FIG. 19A is a flowchart illustrating one example of a procedure for setting the beam pattern of a transmitting antenna for a response frame (for example, a CTS frame) in response to a MAC frame (for example, an RTS frame) received by a data-receiving wireless communication device in a fourth modification of the first embodiment, and FIG. 19B is a sequence diagram showing one example of signaling in which a frame type is changed upon reception of a CTS frame, the signaling being performed by a data-transmitting wireless communication device and the data-receiving wireless communication device in the fourth modification of the first embodiment.

FIG. 19A has a flowchart and FIG. 19B has a sequence diagram when "data" and Ack" in FIG. 4A and FIG. 5A are replaced with "frame".

Instead of checking whether or not the transmission of a response with an Ack frame is needed in P2 in FIG. 4A, whether or not the transmission of a response with a frame is needed is checked in FIG. 19A. Instead of checking the retry bit in a data frame in P4 in FIG. 4A, whether or not the type of previously received frame and the type of frame received this time are different from each other is checked in FIG. 19A. That is, YES in P4R corresponds to a determination in S4R in FIG. 19B described below, and NO in P4R corresponds to a determination in S2R in FIG. 19B.

Also, instead of transmitting a response with an Ack frame in P6 and P8 in FIG. 4A, a response with a frame corresponding to the type of received frame is transmitted in P6R and P8R in FIG. 19A. That is, P6R corresponds to the transmission of a response with an Ack frame in S4R in FIG. 19, and P8R corresponds to the transmission of a response with a CTS frame in S2R in FIG. 19B.

Next, FIG. 19B is a sequence diagram of transmission and reception of data and Ack after transmission and reception of an RTS and a CTS. Since the RTS does not include a sequence number and a retry bit, the data-receiving wireless communication device Dv2 does not make a determination as to RTS retransmission. However, since the data-receiving wireless communication device Dv2 has received a second RTS, it changes the beam pattern in a second CTS transmission (S2R). That is, since this corresponds to NO in P4R in FIG. 19A, the data-receiving wireless communication device Dv2 changes the beam pattern.

Next, upon receiving the CTS, the data-transmitting wireless communication device Dv1 changes the transmission frame type from "RTS" to "data" and transmits data including information of a sequence number and a retry bit (S3R).

Next, since the data-receiving wireless communication device Dv2 receives the data after transmitting the CTS, it determines that the CTS was received by the data-transmitting wireless communication device Dv1 and returns an Ack without changing the beam pattern (S4R). That is, since this corresponds to YES in P4R in FIG. 19A, the data-receiving wireless communication device Dv2 does not change the beam pattern.

Also, in the response transmission, not just in the case in which an Ack frame is transmitted, a Reverse Direction system for performing transmission including a data frame and an Ack frame (for example as described in IEEE802.11) may also be used.

In each embodiment described above, when the data-receiving wireless communication device Dv2 changes the beam pattern of the transmitting antenna ATX, for example, it may set the beam pattern to one of a beam pattern adjacent to the current beam pattern, a beam pattern corresponding to an identification number, which is given to each beam pattern, and a randomly selected beam pattern among a plurality of switchable beam patterns.

In each embodiment described above, when a MAC frame or an aggregation frame is continuously received a plurality of times to exceed a predetermined threshold, the data-receiving wireless communication device Dv2 may also change the beam pattern of the transmitting antenna ATX. This allows the data-receiving wireless communication device Dv2 to avoid, for example, an unnecessary change of the beam pattern of the transmitting antenna ATX, the change being caused by non-arrival of an Ack frame or block Ack frame as a result of an instantaneous change in the communication environment.

This application claims priority to Japanese Patent Application No. 2013-126060, filed on Jun. 14, 2013, the contents of which are hereby incorporated by reference.

INDUSTRIAL APPLICABILITY

The present disclosure is useful as a wireless communication device that avoids an unnecessary change of the beam pattern of an antenna and that suppresses deterioration of the quality of communication.

REFERENCE SIGNS LIST 1, 1A, 1B wireless communication device
11 wireless receiving unit
12 response-needed/not-needed determining unit
13 response-frame generating unit
14 wireless transmitting unit
16 antenna control unit
16R receiving-antenna control unit
16T transmitting-antenna control unit
15 determining unit
15A retransmission-bit determining unit
15B SN determining unit
ARX receiving antenna
ATX transmitting antenna
Dv1 data-transmitting wireless communication device
Dv2 data-receiving wireless communication device

The invention claimed is:

1. A wireless communication device comprising:
a receiver which, in operation, receives a first transmission frame via a receiving antenna, the first transmission frame being a MAC frame transmitted from a communication partner;
a controller which, in operation,
generates a first response frame indicating reception of the first transmission frame;
determines whether or not the same first transmission frame is retransmitted from the communication partner; and
updates a beam pattern of a transmitting antenna in response to determining the same first transmission frame is retransmitted from the communication partner; and
a transmitter which, in operation, transmits the first response frame via the transmitting antenna using the updated beam pattern.

2. The wireless communication device according to claim 1,
wherein the first transmission frame includes retransmission bit information indicating whether or not the first transmission frame is retransmitted, and
when the retransmission bit information in the received first transmission frame indicates retransmission of the first transmission frame, the controller determines that the same first transmission frame is retransmitted from the communication partner.

3. The wireless communication device according to claim 1,
wherein the first transmission frame includes identification number information indicating identification information of the first transmission frame, and
when the identification number information in the received first transmission frame remains the same, the controller determines that the same first transmission frame is retransmitted from the communication partner.

4. The wireless communication device according to claim 1,
wherein, after the first response frame is transmitted, the controller maintains the beam pattern of the transmitting antenna in response to receiving a second transmission frame transmitted from the communication partner, the second transmission frame being of a frame type different from the first transmission frame, and
the transmitter transmits a new transmission frame to the communication partner using the maintained beam pattern of the transmitting antenna.

5. The wireless communication device according to claim 1,
   wherein, after the first response frame is transmitted, the controller determines whether or not the number of retransmissions of the first transmission frame has reached a predetermined upper limit number of times in response to receiving a second transmission frame transmitted from the communication partner, the second transmission frame being of a frame type different from the first transmission frame; and
   when the controller determines that the number of retransmissions of the first transmission frame has reached the predetermined upper limit number of times, the controller updates the beam pattern of the transmitting antenna for use in transmitting a second response frame indicating reception of the second transmission frame.

6. The wireless communication device according to claim 1,
   wherein, after the first response frame is transmitted, the controller maintains the beam pattern of the transmitting antenna and sets, for the receiving antenna, a beam pattern that is the same as the maintained beam pattern of the transmitting antenna in response to receiving a second transmission frame transmitted from the communication partner, the second transmission frame being different from the first transmission frame.

7. The wireless communication device according to claim 1,
   wherein the first transmission frame transmitted from the communication partner includes a plurality of data frames, which include identification number information different from each other; and
   the transmitter transmits the first response frame, which indicates reception of some or all of the plurality of data frames, to the communication partner.

8. A wireless communication method comprising:
   receiving a first transmission frame via a receiving antenna, the first transmission frame being a MAC frame transmitted from a communication partner;
   generating a first response frame indicating reception of the first transmission frame;
   determining whether or not the same first transmission frame is retransmitted from the communication partner;
   updating a beam pattern of a transmitting antenna in response to determining the same first transmission frame is retransmitted from the communication partner; and
   transmitting the first response frame via the transmitting antenna using the updated beam pattern.

9. The wireless communication method according to claim 8,
   wherein the first transmission frame includes retransmission bit information indicating whether or not the first transmission frame is retransmitted, and
   determining the same first transmission frame is retransmitted from the communication partner when the retransmission bit information in the received first transmission frame indicates retransmission of the first transmission frame.

10. The wireless communication method according to claim 8,
    wherein the first transmission frame includes identification number information indicating identification information of the first transmission frame, and
    determining the same first transmission frame is retransmitted from the communication partner when the identification number information in the received first transmission frame remains the same.

11. The wireless communication method according to claim 8, comprising:
    after transmitting the first response frame, maintaining the beam pattern of the transmitting antenna in response to receiving a second transmission frame transmitted from the communication partner, the second transmission frame being of a frame type different from the first transmission frame, and
    transmitting a new transmission frame to the communication partner using the maintained beam pattern of the transmitting antenna.

12. The wireless communication method according to claim 8, comprising:
    after transmitting the first response frame, determining whether or not the number of retransmissions of the first transmission frame has reached a predetermined upper limit number of times in response to receiving a second transmission frame transmitted from the communication partner, the second transmission frame being of a frame type different from the first transmission frame; and
    in response to determining that the number of retransmissions of the first transmission frame has reached the predetermined upper limit number of times, updating the beam pattern of the transmitting antenna for use in transmitting a second response frame indicating reception of the second transmission frame.

13. The wireless communication method according to claim 8, comprising
    after transmitting the first response frame, maintaining the beam pattern of the transmitting antenna and setting, for the receiving antenna, a beam pattern that is the same as the maintained beam pattern of the transmitting antenna in response to receiving a second transmission frame transmitted from the communication partner, the second transmission frame being different from the first transmission frame.

14. The wireless communication method according to claim 8,
    wherein the first transmission frame transmitted from the communication partner includes a plurality of data frames, which include identification number information different from each other; and
    the first response frame indicates reception of some or all of the plurality of data frames.

* * * * *